United States Patent [19]

Soga et al.

[11] Patent Number: 5,610,893
[45] Date of Patent: Mar. 11, 1997

[54] INFORMATION RECORDING AND REPRODUCING APPARATUS FOR COPYING INFORMATION FROM EXCHANGEABLE MASTER RECORDING MEDIUM TO A PLURALITY OF OTHER EXCHANGEABLE RECORDING MEDIA

[75] Inventors: Takumi Soga; Kunio Yamamiya, both of Sagamihara, Japan

[73] Assignee: Olympus Optical Co., Ltd., Tokyo, Japan

[21] Appl. No.: 429,713

[22] Filed: Apr. 27, 1995

[30] Foreign Application Priority Data

| Jun. 2, 1994 | [JP] | Japan | 6-121565 |
| Jul. 8, 1994 | [JP] | Japan | 6-157542 |
| Oct. 25, 1994 | [JP] | Japan | 6-260021 |

[51] Int. Cl.$^6$ ............................................. G11B 7/00
[52] U.S. Cl. ................................... 369/84; 369/58
[58] Field of Search ..................... 369/84, 47, 58, 369/85, 48; 360/15

[56] References Cited

U.S. PATENT DOCUMENTS

| 5,097,461 | 3/1992 | Majima | 369/84 |
| 5,140,567 | 8/1992 | Kawabata et al. | 369/84 |
| 5,301,181 | 4/1994 | Shiba et al. | 369/84 |
| 5,349,477 | 4/1994 | Shuto | 369/84 |
| 5,359,583 | 10/1994 | Jung | 369/84 |
| 5,402,406 | 3/1995 | Fuma et al. | 369/84 |
| 5,414,688 | 5/1995 | Inokuchi | 369/84 |
| 5,453,968 | 9/1995 | Veldhuis et al. | 369/84 |
| 5,485,443 | 1/1996 | Niwayama | 369/84 |

FOREIGN PATENT DOCUMENTS

| 2-192068 | 7/1990 | Japan | 369/84 |
| 2-210643 | 8/1990 | Japan | 369/84 |
| 4-147466 | 5/1992 | Japan | 369/84 |
| 6-75703 | 3/1994 | Japan . | |

*Primary Examiner*—Nabil Hindi
*Attorney, Agent, or Firm*—Armstrong, Westerman, Hattori, McLeland & Naughton

[57] ABSTRACT

An information recording and reproducing apparatus for copying information from a master medium to a plurality of copying media, including a master medium reproducing unit for reading information from the master medium; a plurality of copying-medium recording unit for writing the information read from the master medium onto copying media; and a copying operation controlling unit for controlling the above-described recording and reproducing units; wherein a copying process is started when the copying operation controlling unit detects the mounting of a master medium into the master medium reproducing unit. At the end of a copying process, successful media are automatically ejected from the apparatus, whereas unsuccessful ones remain in the apparatus without being ejected, so that a user can easily know which media are successful and which ones are unsuccessful.

14 Claims, 13 Drawing Sheets

INFORMATION RECORDING AND REPRODUCING APPARATUS FOR COPYING INFORMATION FROM EXCHANGEABLE MASTER RECORDING MEDIUM TO A PLURALITY OF OTHER EXCHANGEABLE RECORDING MEDIA

BACKGROUND OF THE INVENTION

1. Field of the Invention

The present invention relates to an information recording and reproducing apparatus for recording information on or reproducing information from an exchangeable recording medium such as a magneto-optic disk or a phase change optical disk, and more particularly, to an information recording and reproducing apparatus for copying information from an exchangeable master medium to a plurality of exchangeable media.

2. Description of the Related Art

Exchangeable and portable information recording media such as floppy disks are now widely used in information processing systems such as small-sized computers. Exchangeable optical recording media such as magneto-optical disks and phase change optical disks-are also used to record a great amount of information such as image data.

Exchangeable recording media of these types are useful to produce a plurality of duplications of an original (master) medium by copying the entire information from the master medium to other media, and thus this duplication technique is advantageously used to distribute or publish information.

In a recording and reproducing apparatus used together with magneto-optical disks or floppy disks, there have been proposed various types of exchangeable recording medium copying apparatus for copying information from a master medium to a plurality of other disks, thereby producing a plurality of disks having the same information at the same time.

For example, a conventional copying apparatus for magneto-optical disks generally includes: a disk drive unit for reproducing information from a master medium; a plurality of disk drive units for recording the information onto copying media; operation means such as a switch or the like by which the copying operation is stated; and a hard disk unit for temporarily storing the information recorded on the master medium.

In this type of copying apparatus for magneto-optical disks, a copying operation is started in response to an operation of a switch or the like performed by a user. In the copying operation, the apparatus temporarily transfers the entire information from a master medium to a hard disk, and then writes the information stored temporarily in the hard disk onto a plurality of media.

In some cases, however, starting a copying operation requires complicated switching operations. Furthermore, in the case of a copying apparatus for magneto-optical disks, it takes a long time to record information on a medium via a disk drive unit, which results in long waiting times in operations performed by a controller or in operations performed by other disk drive units. In the technique in which the entire information recorded on a master medium is stored temporarily on a hard disk before copying the information to other media, the efficiency of a copying operation is poor.

In a common information recording and reproducing apparatus having the capability of copying information from a master medium to a plurality of media, as described above, the entire information recorded on a master medium is transferred temporarily to buffer memory means such as a hard disk in response to a copying process starting command issued by a user, and then recorded on a plurality of coping media. This means that the user has to perform some operation via a switch or the like to start a copying process. However, the operation for starting a copying process is complicated in many cases.

SUMMARY OF THE INVENTION

It is an object of the present invention to provide an information recording and reproducing apparatus having the capability of copying information from a medium to a plurality of other media wherein the copying operation can be started simply by inserting media into the apparatus.

It is another object of the present invention to provide an information recording and reproducing apparatus capable of preventing erroneous operation during a copying process thereby protecting the information recorded on a master medium.

It is still another object of the present invention to provide an information recording and reproducing apparatus that operates in such a manner that successfully-copied media are automatically ejected from the apparatus at the end of a copying process while such media that encountered an error during the copying process are not ejected at the end of the copying process. Thus, these unsuccessful media may be removed by a manual operation of a user, whereby a user can easily know or identify which media are successful and which ones are unsuccessful in the copying process.

It is a further object of the present invention to provide a highly reliable and highly efficient information recording and reproducing apparatus that is capable of starting a copying processing without a significantly long waiting time and which also has the capability of preventing a copying process to be started by mistake under undesirable conditions.

It is a further object of the present invention to provide a highly reliable and highly efficient information recording and reproducing apparatus having the capability of setting a minimum limiting number of media to be copied at a time, thereby preventing the starting of a copying process for a very small number of copying media.

To achieve the above objects, the present invention provides an information recording and reproducing apparatus including master medium reproducing means for reading information from a master medium, and a plurality of copying-medium recording means for writing information read from the master medium onto a plurality of copying media thereby copying information from the master medium to the plurality of copying media, the apparatus including copying operation controlling means, the copying operation controlling means including:

medium mounting detection means for detecting whether a master medium is mounted in the master medium reproducing means;

and copying process starting means for starting a copying process in response to the detection of the mounting of the master medium.

The various features and advantages of the present invention may be more readily understood with reference to the following detailed description taken in conjunction with the accompanying drawings.

BRIEF DESCRIPTION OF THE DRAWINGS

FIGS. 2 and 3 are schematic diagrams illustrating the external appearance and internal construction of the information recording and reproducing apparatus, wherein:

FIG. 2 is a front view of the information recording and reproducing apparatus; and FIG. 3 is a side view of the information recording and reproducing apparatus;

FIGS. 7 to 9 are flow charts illustrating the operation process of the information recording and reproducing apparatus according to the first embodiment of the invention, wherein:

FIG. 7 is a flow chart illustrating a pre-process;

FIG. 8 is a flow chart illustrating a copying process; and

FIG. 9 is a flow chart illustrating a post-process;

FIGS. 14 and 15 are flow charts illustrating an operation process in the information recording and reproducing apparatus according to the third embodiment of the invention, wherein:

FIG. 14 is a flow chart illustrating an operation process from the beginning to the start of a copying process; and FIG. 15 is a flow chart illustrating a copying process.

DETAILED DESCRIPTION OF THE PREFERRED EMBODIMENTS

A first embodiment according to the present invention is described below referring to FIGS. 1 through 9.

In this embodiment, the invention is applied to an information recording and reproducing apparatus for exchangeable recording media, where the information recording and reproducing apparatus has the capability of copying information from a master medium to a plurality of copying media. In this embodiment as described below, it is assumed that magneto-optical disks are employed as the exchangeable recording media, whereas the invention may also be applied to apparatus designed to use other types of exchangeable media such as phase-change optical disks, CD-Rs, floppy disks, optical servo-control floppy disks, etc.

Figure 1:
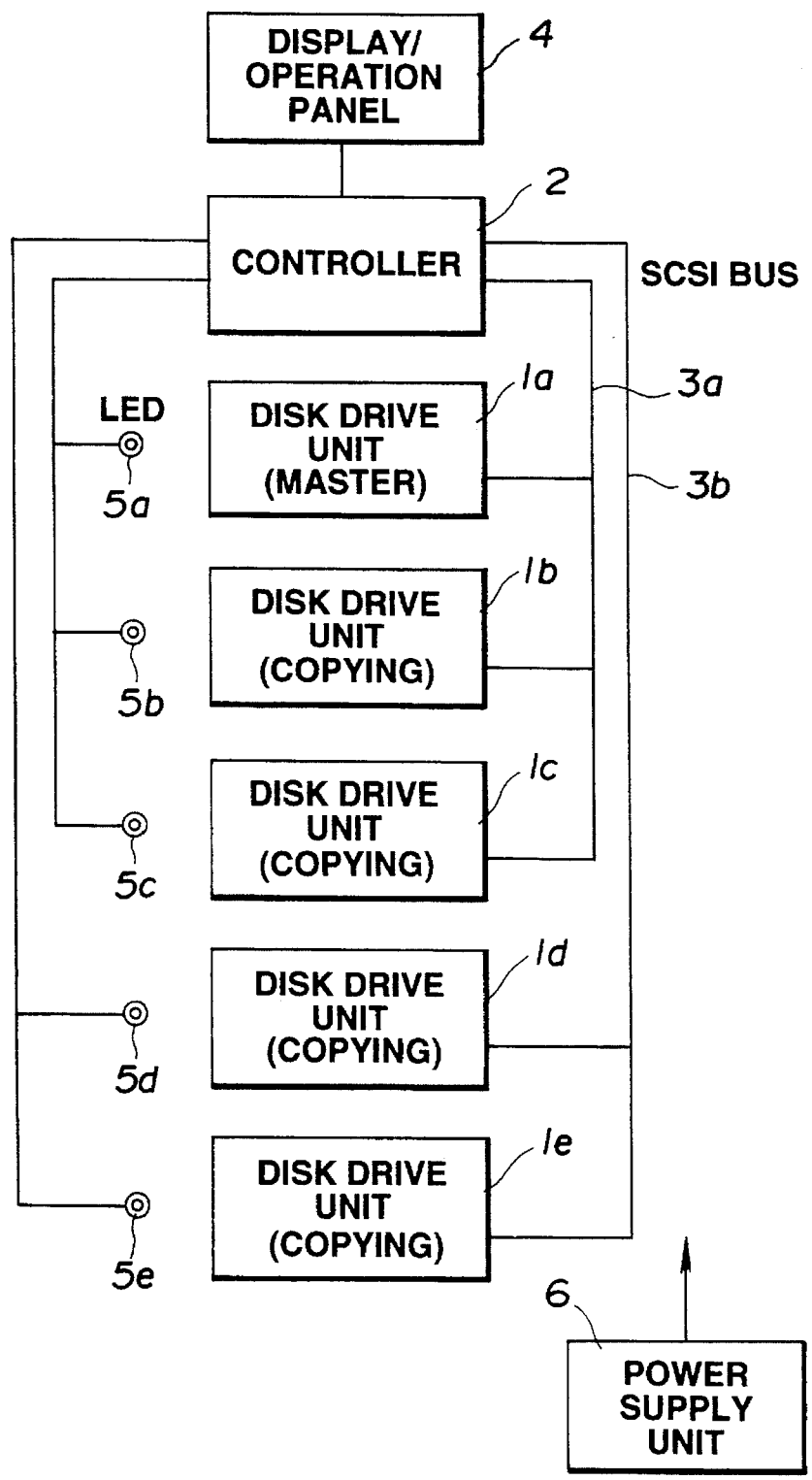
FIG. 1 is a block diagram generally illustrating an information recording and reproducing apparatus according to a first embodiment of the present invention.

As illustrated in FIG. 1, the information recording and reproducing apparatus according to the present embodiment includes: a disk drive unit 1a serving as master medium reproducing means for reading data from a master disk mounted in the disk drive unit 1a; a plurality of copying disk drive units 1b, 1c, 1d, and 1e serving as copying-medium recording means for writing the data onto disks mounted in these copying disk drive units; and a controller 2 serving as copying operation controlling means for controlling the above-mentioned disk drives.

The master and copying disk drive units 1a through 1e are connected to the controller 2 via two separate SCSI (small computer system interface) buses 3a and 3b. In the particular example shown in FIG. 1, the disk drive units 1a, 1b, and 1c are connected to the controller 2 via the SCSI bus (1) 3a, whereas the disk drive units 1d and 1e are connected to the controller 2 via the SCSI bus (2) 3b, so that control commands and data can be transmitted between these disk drive units and the controller 2 via the SCSI buses 3a and 3b.

The apparatus also includes: a display/operation panel 4 for displaying the operation status of the apparatus; and drive LEDs 5a through 5e serving as indicators for indicating the status of each disk drive unit, wherein display/operation panel 4 and the drive LEDs are connected to the controller 2. Each drive LED 5a–5e includes two LEDs such as green and red LEDs acting as error indicating means wherein the red LED is turned on when an error occurs in the corresponding disk drive unit. There is also provided a power supply unit 6 connected to various parts of the apparatus such as the disk drive units 1a–1e, the controller 2, and the display/operation panel 4 so as to supply electrical power to these elements.

Figure 2:
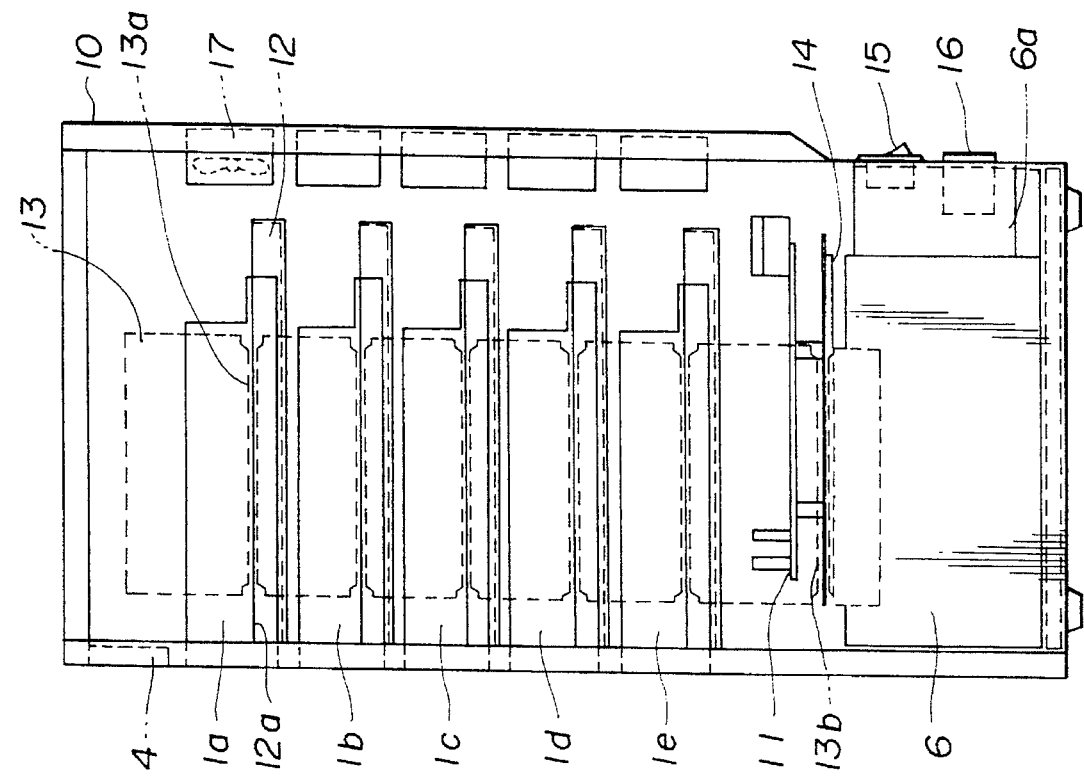
Figure 3:
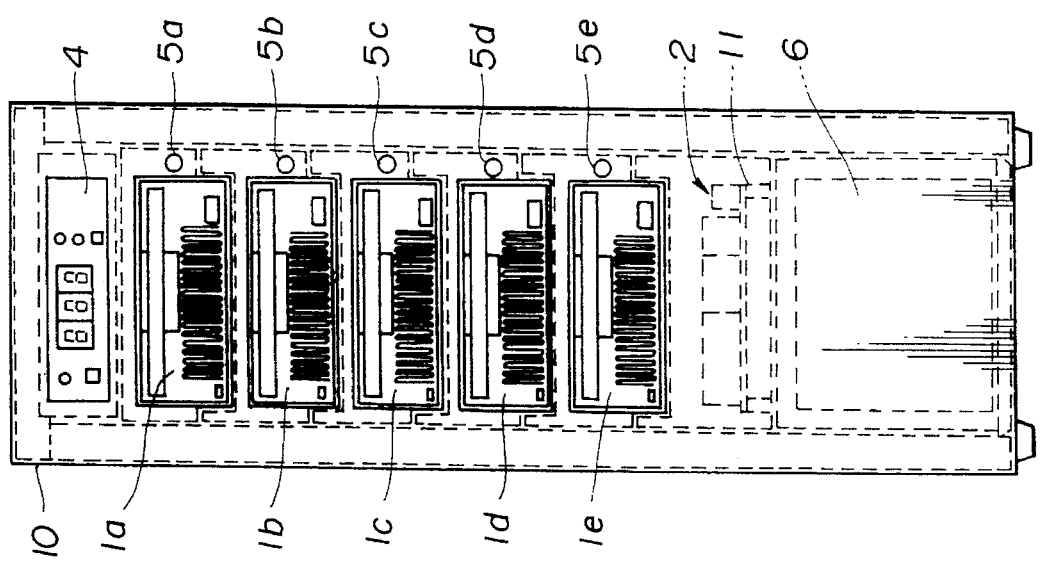

FIGS. 2 and 3 illustrate the external appearance and the inward construction of the information recording and reproducing apparatus of the embodiment. FIG. 2 is a front view of the apparatus, and the FIG. 3 is a side view of the same apparatus. In FIG. 3, the side of the enclosure is removed so that the inside of the apparatus can be seen.

All parts of the information recording and reproducing apparatus are housed in the enclosure 10 in such a manner described below. The display/operation panel 4 is disposed on the front side of an enclosure 10, and the disk drive units 1a through 1e are arranged one on another below the display/operation panel 4 wherein the display/operation panel 4 and the disk drive units 1a–1e are exposed to the outside through the front side of the enclosure. The drive LEDs 5a–5e are disposed on the front panel at the sides of corresponding drive units 1a–1e. A control circuit board 11 on which the controller circuit 2 is mounted is disposed below the disk drive units 1a–1e. The power supply unit 6 is disposed at the bottom of the enclosure 10.

A holder 12 is attached to each disk drive unit 1a–1e so that each disk drive unit is held on the corresponding holder 12 wherein the protrusions 12a formed at both sides of each holder 12 are fitted to brackets disposed on both sides of the enclosure 10. Rails 13a are disposed on the brackets 13 at heights equally spaced corresponding to the positions of disk drive units 1a–1e so that disk drive units 1a–1e can be inserted into the enclosure 10 from its back side toward its front side along the rails 13a disposed on the brackets 13 thereby installing the disk drive units 1a–1e in the enclosure.

Rails 13b are also disposed at the lower part of the brackets 13 so that the control circuit board 11 held by the board holder 14 can be inserted into the enclosure 10 along the rails 13b thereby installing the control circuit board 11 in the enclosure 10.

An AC power unit 6a including a power switch 15 and AC inlet and outlet 16 is disposed at the back of the power supply unit 6 disposed at the bottom of the enclosure 10 wherein the power switch 15 and AC inlet and outlet 16 are exposed to the outside via the back panel. Furthermore, cooling fans 17 are each disposed at the back of each disk drive unit 1a–1e so as to cool the disk drive units by exhausting air from the inside to the outside or sucking air from the outside into the inside. The cooling fans may be installed separately from the disk drive units as in this example, or otherwise they may also be installed inside the disk drive units. When the cooling fans are installed in the disk drive units, air holes are formed in the back panel of the enclosure at the positions corresponding to the cooling fans.

Whereas all components are disposed in the enclosure in an integral form in the above example, the disk drive units 1a–1e may also be disposed separately from the controller 2 and the display/operation panel 4, or the disk drive units may also be divided into a plurality of groups. The number and arrangement of disk drive units can be properly selected to satisfy requirements in a particular application.

Figure 4:
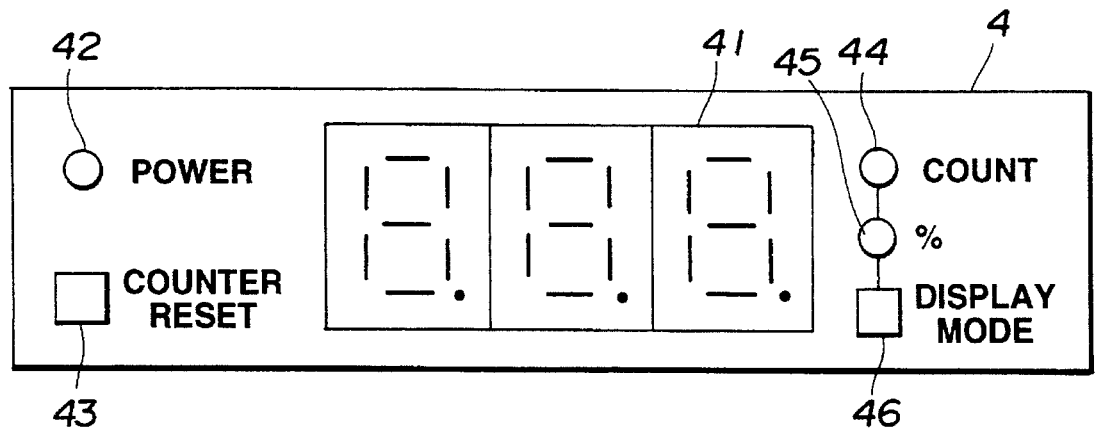
FIG. 4 is a plan view illustrating a display/operation panel.

FIG. 4 illustrates the details of the display/operation panel 4. At the center of the display/operation panel 4, there is disposed a counter display 41 serving as means for indicating the percentage of a copying process which has been done already, or as means for indicating the number of copied media. The counter display 41 includes three seven-segment display elements arranged in a row so that a three-digit number can be displayed.

On the left side of the display/operation panel 4, there are disposed: a pilot LED 42 consisting of a green LED that is illuminated when electric power is supplied to the apparatus; and a counter reset switch 43 for resetting the number of copied media displayed on the counter display 41. On the right side of the display/operation panel 4, there are disposed: an LED 44 that is illuminated when the counter display 41 acts as an indicator for indicating the number of copied media; an LED 45 that is illuminated when the counter display 41 acts as an indicator for indicating the percentage of a copying process which has been done already; and a display mode selection switch 46 for manually switching the display mode between a mode in which the number of copied media is displayed and the other mode in which the percentage of a copying process which has been done already is displayed. The LEDs 44 and 45 each consist, for example, of a green LED.

In this display/operation panel 4, the green LED 42 is illuminated when the power switch 15 of the apparatus is turned on and thus electric power is supplied to the apparatus. During a copying operation, the green LED 45 is illuminated and the percentage of a copying process which has already been accomplished is displayed on the counter display 41. When the copying operation is complete, the green LED 44 is illuminated and the number of copied media is displayed on the counter display 41. If required, the number of copied media displayed on the counter display 41 can be reset to 0 by pressing the reset switch 43 before starting another copying operation. Furthermore, if the display mode selection switch 46 is pressed, the display mode is switched between the mode in which the number of copied media is displayed and the mode in which the percentage of the copying process which has already been accomplished is displayed.

In an alternative embodiment, the display/operation panel may include separate displays for displaying the number of copied media and the percentage of a copying process which has been done already, respectively. In yet another alternative embodiment, the display/operation panel may be composed of a liquid crystal display panel on which the information described above may be displayed.

Figure 5:
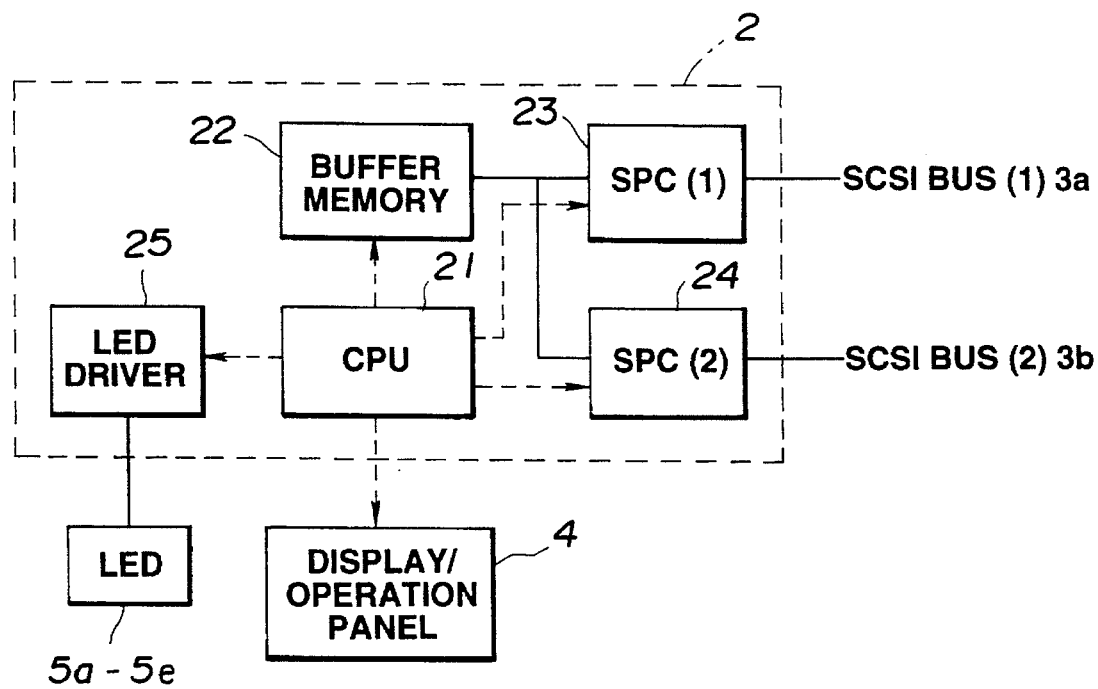
FIG. 5 is a block diagram illustrating the configuration of a controller.

The detailed configuration of the controller 2 is shown in FIG. 5. The controller 2 includes: a CPU 21 responsible for controlling various elements; a buffer memory 22 for storing data read from a master disk via the disk drive unit 1a, wherein an amount of data corresponding to a predetermined number of blocks is read; SCSI protocol controllers (SPC) (1) 23 and (2) 24 responsible for sequential control associated with the SCSI buses (1) 3a and (2) 3b, respectively; and an LED driver 25 for driving and lighting the LEDs 5a through 5e.

As shown in FIG. 5, the CPU 21 transmits control signals to the SPC (1) 23, the SPC (2) 24, the buffer memory 22, the display/operation panel 4, and the LED driver 25, thereby controlling these elements. Under the control of the CPU 21 via the SPC (1) 23 and the SPC (2) 24, the disk drive units 1a–1e connected to the SCSI buses 3a and 3b perform reading and writing operations as follows: A given amount of data corresponding to a predetermined number of blocks is read at a time from a master disk mounted in the master disk drive unit 1a and then stored in the buffer memory 22. The data stored in the buffer memory 22 is then transferred to the disk drive units 1a–1e and written onto disks mounted in the respective disk drive units. Depending on the condition of the apparatus, the CPU 21 controls the display/operation panel 4 and the LED driver 25, thereby controlling the displaying parts of the display/operation panel 4 and the LEDs 5a–5e.

The buffer memory 22 is constructed with a semiconductor memory having a capacity of, for example, 2 MB, wherein the capacity is determined depending on the time efficiency required in copying operations. A part of data read from the master disk is stored temporarily in the buffer memory 22. In this embodiment, two SCSI buses are used so as to improve the operating efficiency of disk drive units thereby improving the copying operation speed, whereas the number of SCSI buses should be properly selected depending on the total number of disk drive units used. Three disk drive units are connected to each SCSI bus in this embodiment, whereas the number of disk drive units connected to each SCSI bus may be properly selected within the range from 1 through 7.

Figure 6:
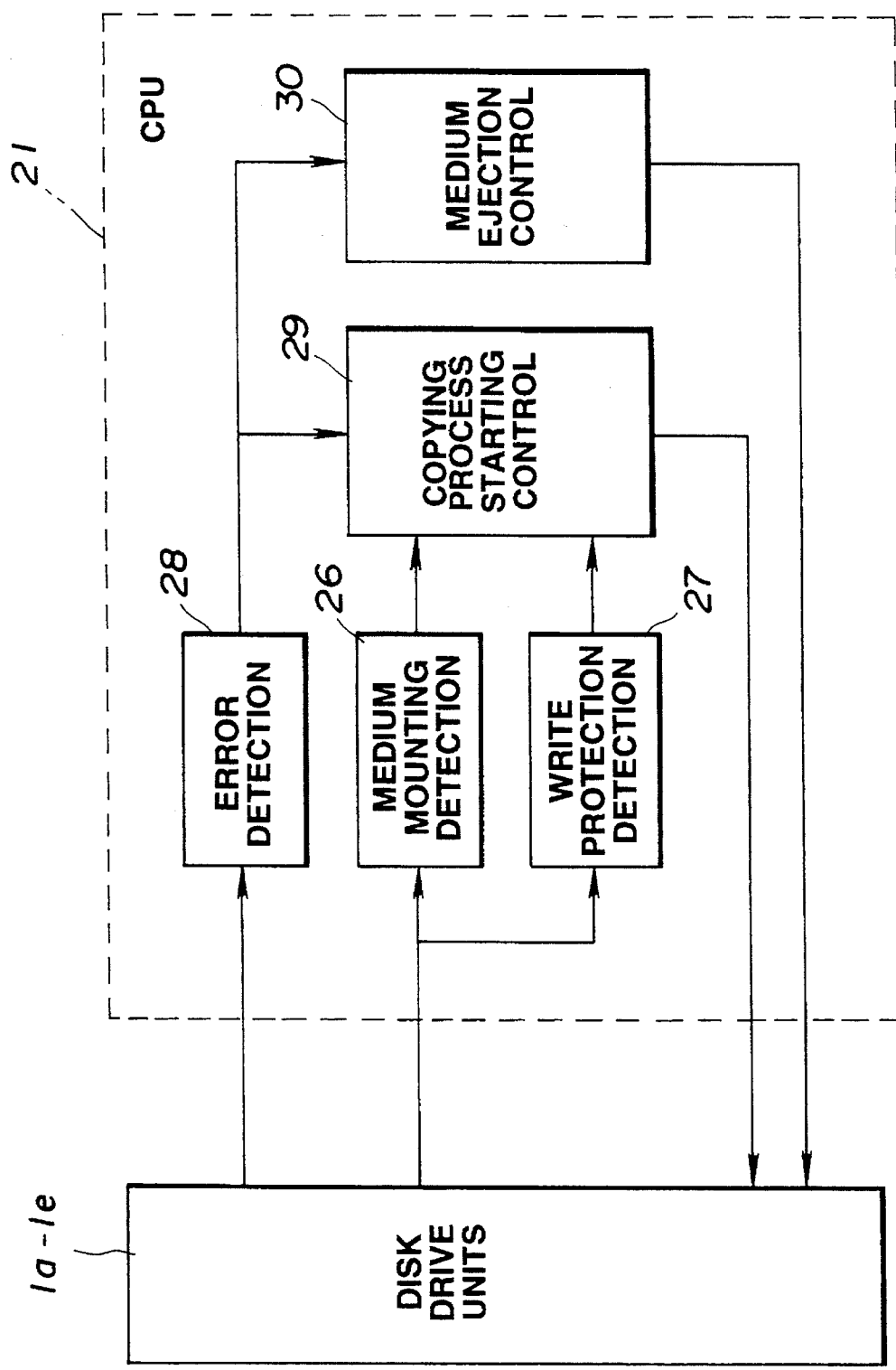
FIG. 6 is a functional block diagram of a CPU used in the first embodiment.

FIG. 6 is a functional block diagram of the CPU 21 according to the first embodiment.

As shown in FIG. 6, the CPU 21 essentially consists of: medium mounting detection means 26 for detecting whether a master disk is mounted in the master disk drive unit by checking, for example, a signal generated by a switch disposed near the insertion slot; write protection detecting means 27 for detecting whether the master disk is write-protected; error detection means 28 for detecting an error during a copying process; copying process starting means 29 for starting a copying process in response to the detection of mounting of a master disk; and medium ejection control means 30 for ejecting successfully-copied disks from disk drive units while leaving those disks which encountered an error during the copying process, wherein the ejection is performed at the end of the copying process in accordance with the detection result given by the error detection means 28.

When the CPU 21 detects via the medium mounting detection means 26 that disks have been mounted in copying disk drive units, the CPU 21 checks whether a master disk has been mounted in the master disk drive unit. If a master disk has been mounted, the CPU 21 starts a copying process via the copying process starting means 29. Alternatively, the copying process starting means 29 may start a copying process provided that the following conditions are met: the medium mounting detection means detects that a master disk is mounted; and the write protection detecting means detects that the write protection mechanism of the master disk is set to a write protection position. The CPU 21 monitors the occurrence of an error during the copying process via the error detection means 28, so that when the copying process is complete, the medium ejection control means ejects only the successfully-copied disks from copying disk drive units whereas, those disks that encountered an error during the copying process remain in disk drive units.

The operation of the information recording and reproducing apparatus according to the first embodiment is now described below.

Before using the information recording and reproducing apparatus, the power switch 15 is turned off and a power cable (not shown) is connected to the AC inlet disposed on the back side of the information recording and reproducing apparatus whereas the other end of the power cable is connected to a commercial AC power line. The power switch 15 is then turned on so that AC power is supplied to the apparatus. Under the control of the CPU 21, "0" is displayed on the display/operation panel 4 as the number of copied media, and all green LEDs 5a–5e disposed at the sides of the disk drive units 1a–1e are turned on. The CPU 21 checks whether disks are present in disk drive units 1a–1e. If disks are found to be present in some disk drive units when the power is turned on, the disks are ejected from the disk drive units.

A process for copying data from a master disk to a plurality of disks is described below.

First, a user inserts a desired number of disks into copying disk drive units 1b–1e, thereby mounting the disks in the disk drive units. In this mounting operation, the write protection sliding switch of each disk cartridge is moved to the "off" position so that the write protection is released. When copying disks are mounted, initialization processes associated with the copying disk drive units 1b–1e are performed so as to make the copying disk drive units ready for a recording/reproducing operation. The CPU 21 detects whether copying disks are mounted in the copying disk drive units 1b–1e, and turns off those LEDs of the LEDs 5b–5e corresponding to the drive units in which a disk is mounted.

The user then inserts a master disk into the master disk drive unit 1a, thereby mounting the master disk in the drive unit 1a. Before mounting the master disk in the master drive unit, the write-protection sliding switch of the master disk should be moved to the "on" position so that the master disk is write-protected. When the master disk is mounted, the master disk drive unit 1a performs an initialization process so that the master disk drive unit 1a becomes ready to read data from the master disk. When the CPU 21 detects the mounting of the master disk into the master disk drive unit 1a, the CPU 21 turns off all LEDs 5a–5e and starts a copying process. This means that a copying process can be started only by inserting a master disk into the master disk drive unit after inserting copying disks into the copying disk drive units.

Figure 7:
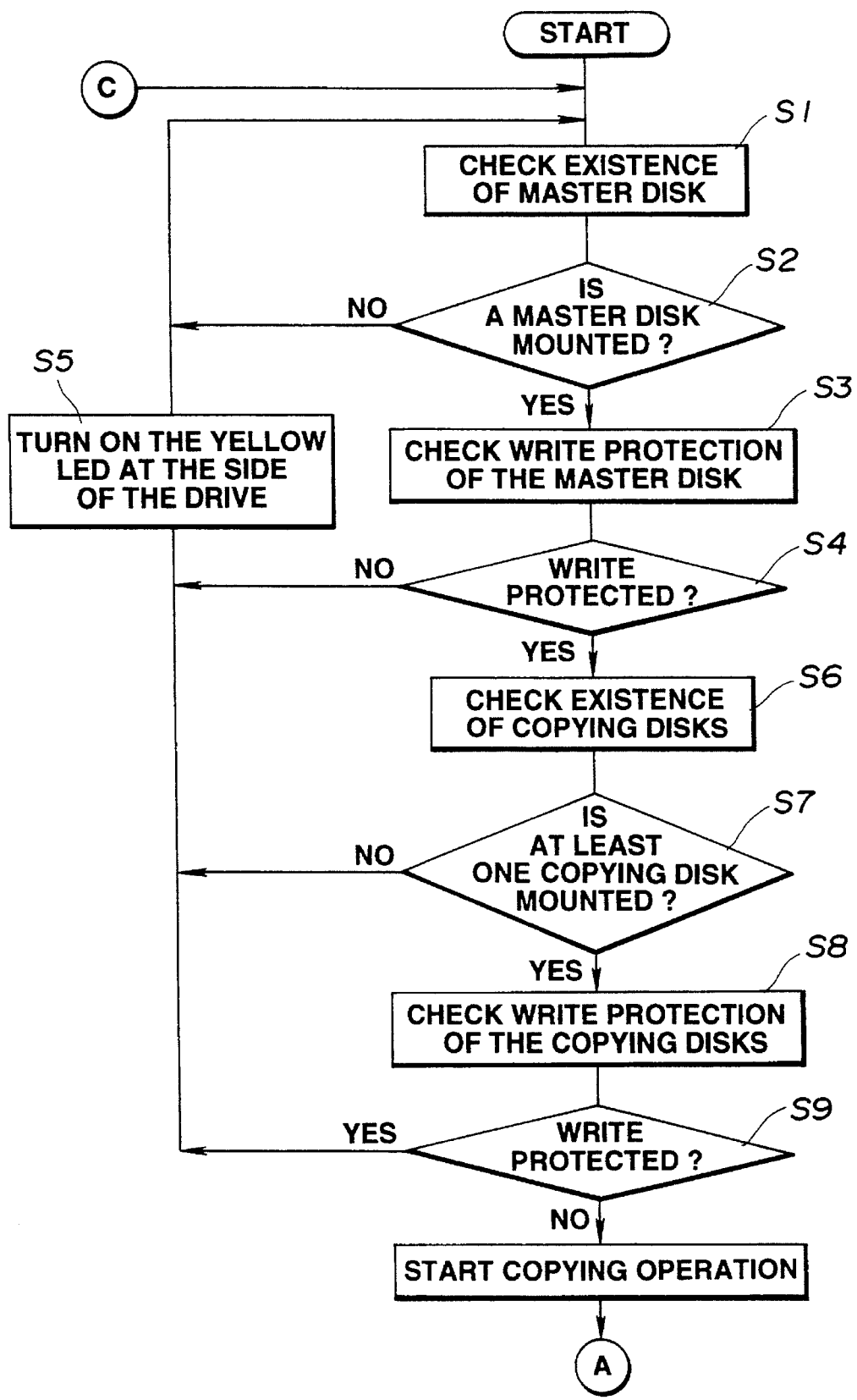
Figure 8:
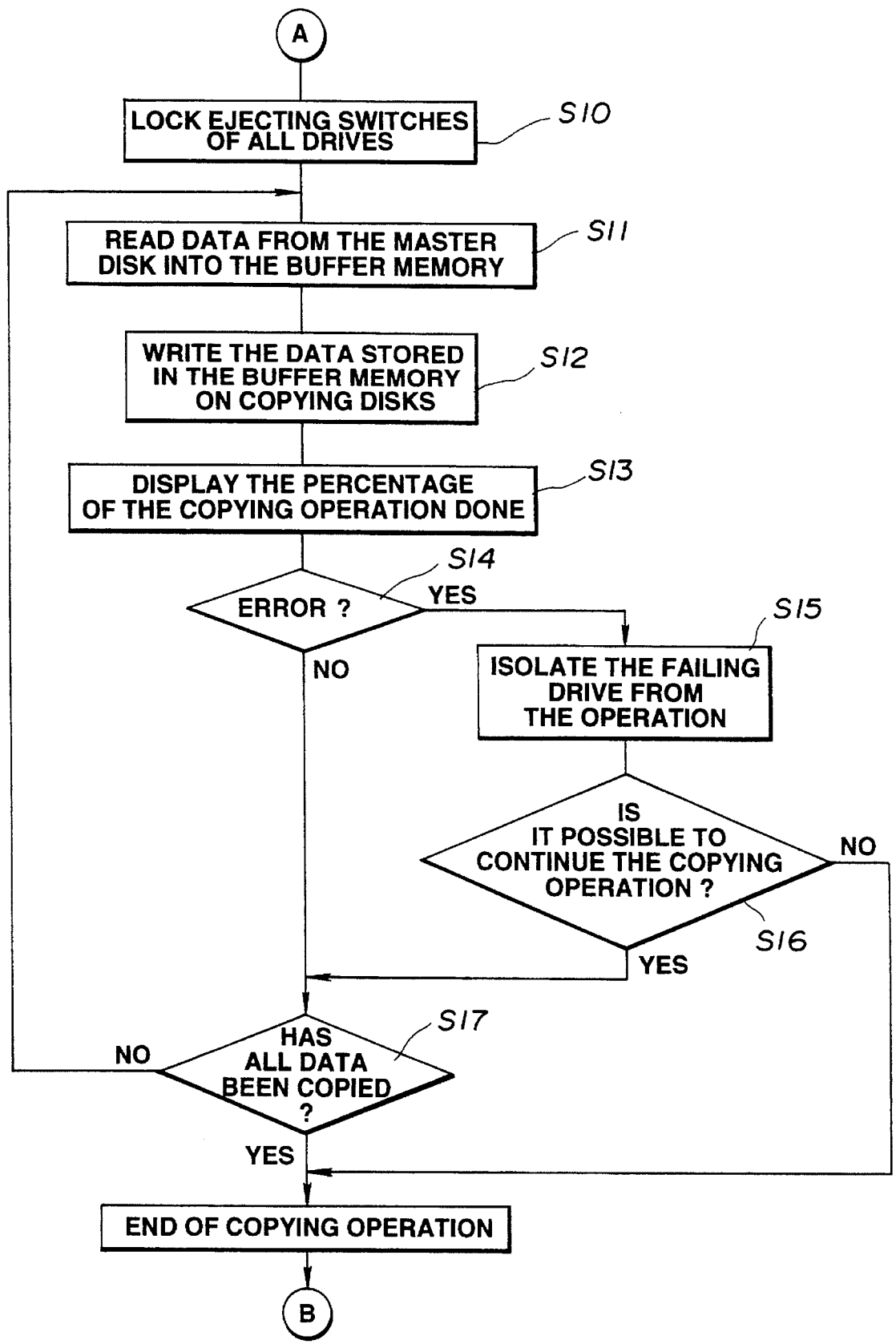
Figure 9:
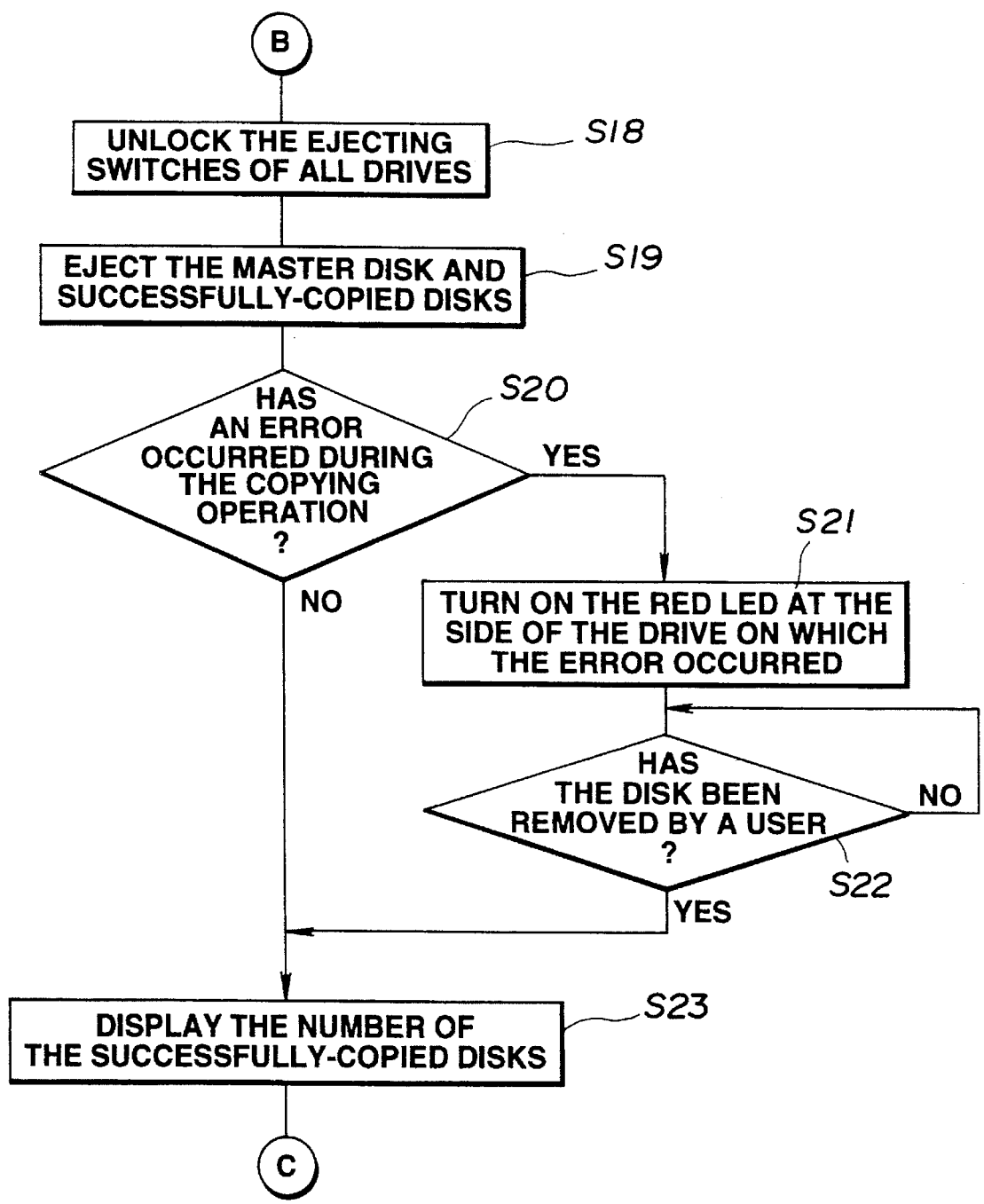

FIGS. 7 through 9 are flow charts illustrating the operations relating mainly to the CPU 21.

First, a pre-process is performed as follows. In step S1, the CPU 21 transmits a command to the master disk drive unit 1a to check whether a master disk is mounted in the master disk drive unit 1a. In step S2, it is determined whether a master disk is mounted in the master disk drive unit. If a master disk is not mounted, the process returns to step S1. That is, the CPU 21 and the master and copying disk drive units 1a–1e are in a waiting state until a master disk is mounted in the master disk drive unit 1a.

If it is concluded in step S2 that a master disk is mounted, the process proceeds to step S3 in which the CPU 21 transmits a command to the master disk drive unit 1a to check whether the master disk is write-protected. In step S4, it is determined whether the master disk is write-protected. If the master disk is not write-protected, the process proceeds to step S5 so as to perform an error handling process in which the LED 5a disposed at the side of the master disk drive unit 1a is turned on to emit yellow light, and then the process returns to step S1.

If it is concluded in step S4 that the master disk which is mounted is write-protected, then the process proceeds to step S6 so as to transmit a command to the copying disk drive units 1b–1e to check whether disks are mounted in the copying disk drive units. In step S7, it is determined whether disks are mounted in the copying disk drive units. If none of the copying disk drive units has a disk mounted, then the process branches to step S5 so as to perform an error handling process in which the LED 5a disposed at the side of the master disk drive unit 1a is turned on to emit yellow light, and then the process returns to step S1.

If disks are mounted in some copying disk drive units, then the process proceeds to step S8 in which a command is transmitted to the copying disk drive units 1b–1e to check whether the disks mounted in the copying disk drive units are write-protected. In step S9, it is determined whether the disks mounted in the copying disk drive units are write-protected. If some disks are write-protected, then the process branches to step S5 so as to perform an error handling process in which the LEDs corresponding to those copying disk drive units having write-protected disks are turned on to emit yellow light, and then the process returns to step S1.

In the error handling process performed in step S5, both green and red LEDs are illuminated so that substantially yellow light is emitted, thereby notifying a user of occurrence of an error that is not very significant. In this case, the process proceeds no further unless the user removes a master disk or a copying disk having a write protection error by pressing an ejection switch. In an alternative embodiment, instead of turning on LEDs, a master disk may be ejected automatically if the master disk is not write-protected or if none of the copying disk drive units has a disk mounted, and copying disks may be ejected automatically if the disks are write-protected. In yet another alternative embodiment, in the event of such an error, not only LEDs are turned on, but corresponding disks may also be ejected.

If it is concluded in step S9 that none of the copying disks mounted in the copying drive units is write-protected, then a copying process shown in FIG. 8 is started. That is, the copying process is started automatically when a write-protected master disk is mounted in the master disk drive unit after mounting one or more copying disks that are not write-protected in the copying disk drive units.

In the copying process, in step S10 shown in FIG. 8, ejecting switches of all disk drive units 1a–1e are locked so as to prevent the disks from being ejected by mistake during the copying process. Then, all the data is copied from the master disk to the copying disks.

In step S11, the CPU 21 transmits a command to the master disk drive unit 1a so that a part of data corresponding to a predetermined number of blocks is read from the master disk and then transferred to the buffer memory 22 via the SCSI bus 3a. In step S12, the CPU 21 transmits a command to the copying disk drive units 1b–1e so that the data stored in the buffer memory 22 is written on the copying disks via the SCSI buses 3a and 3b. In step S13, the CPU 21 transmits a control signal to the display/operation panel 4 so that the percentage of the copying process is displayed on the counter display 41.

In the next step S14, it is checked whether an error has occurred during the copying operation. If an error occurs because of defects of a disk or for other reasons during the data reading or writing processes, then, in step S15, the disk drive unit which encountered the error is isolated from the subsequent processes. Furthermore, in step S1, it is determine if the disk drive units other than the drive unit which encountered the error can continue the copying process. The copying process is terminated whenever an error occurs during an operation of reading data from the master disk or whenever a writing error occurs in all of the copying disk drive units, where it is concluded that the continuation of the copying process is impossible. On the other hand, copying disk drive units having no errors may continue the copying operation.

If it is concluded in step 14 that no error has occurred during the copying process or if it is concluded in step S16 that it is possible to continue the copying process, then the process proceeds to step S17 in which it is determined if all data has been copied from the master disk to the copying disks. If there is data remaining to be copied, the process returns to step S11 so as to repeat steps S11 through S17. In this embodiment, since the capacity of the buffer memory 22 is less than the capacity of a disk, the above-described copying process is performed repeatedly until all data has been copied.

The entire amount of data may also be stored temporarily in a hard disk serving as a buffer memory, as in the conventional apparatus, and then the data may be written onto a plurality of copying disks. However, in this technique, disk drive units often encounter a rather long waiting time during a copying process, which results in a reduction in operating efficiency of the disk drive units. In the present embodiment, in contrast, the number of disk drive units, the number of SCSI buses, and the capacity of the buffer memory are all optimized in order to maximize the operating efficiency of disk drive units and, thus, the copying process can be performed at a high speed without using a hard disk.

If it is concluded in step S17 that all data has been copied, then the post-process shown in FIG. 9 is performed. At this time, "100%" is displayed on the counter display of the display/operation panel 4.

In the first step S18 in the post-process, all ejecting switches of the disk drive units 1a–1e are unlocked. In step S19, a command is sent to those disk drive units, of the disk drive units 1a–1e, that showed no errors during the copying process so that the master disk and the successfully-copied disks are ejected. The green LEDs disposed at the sides of the disk drive units from which the master disk or the copied disks are ejected are illuminated so that the user can know that the copying process is complete with no errors and thus the disk drive units are ready to accept another disk.

In step S20, it is determined whether an error resulting from, for example, defects of a disk has occurred during the copying operation. If an error is detected, then an error-handing process for a copying process error is performed in step S21 such that those red LEDs, of the LEDs 5a–5e, disposed at the sides of the disk drive units which encountered the error are illuminated so as to notify the user of the occurrence of the error. In step S22, it is checked whether the user has removed the disks having the error. If the disks still remain in the disk drives, the process stops until the user removes the disks. The user can remove the disks having the error by pressing the ejecting switches of the corresponding disk drive units. The process never proceeds to further steps unless the user removes the disks having the error from the disk drive units indicated by the red LEDs.

If a failure (either electrical or mechanical failure) occurs in hardware such as a semiconductor laser of some disk drive unit during a copying process, the red LED disposed at the side of the disk drive unit having the failure may blink to warn the user of the failure. If other types of errors (electrical or mechanical errors in the hardware such as the controller 2 or elements other than the disk drive units) occur during an operation of the apparatus, error numbers indicating the causes of errors are displayed on the display/operation panel 4.

If it is concluded in step S20 that there was no error during the copying process or if it is concluded in step S22 that disks having an error have already been removed, then the process proceeds to the final step S23 of the copying process in which a control signal is sent to the display/operation panel 4 so that the total number of successfully-copied disks is displayed on the counter display 41 of the display/operation panel 4. Then, the process returns to step S1 so as to start another copying process.

In the apparatus according to the present embodiment, one copying process needs about 9 min for a 3.5-inch magneto-optical disk having a capacity of 128 MB. Therefore, in the example of the apparatus shown in FIG. 1, four disks can be copied from a master disk every nine minutes.

When it is desired to perform further copying operations using the same master disk, the copied disks are removed from the disk drive units and new copying disks are inserted into the copying disk drive units 1a–1e. The same master disk is then inserted into the master disk drive unit 1a to start a copying process. If it is required to perform a copying process using another master disk, new copying disks are inserted into the copying disk drive units 1b–1e and then a new different master disk is inserted into the master disk drive unit 1a to start the copying process.

The user can reset the number of copied disks displayed on the display/operation panel 4 by pressing the counter reset switch 43. If a new copying process is performed after the completion of a previous copying process without resetting the number of the copied disks, then the number of newly-copied disks is added to the previous number and, thus, the total number is displayed at the end of the new copying process. This is particularly useful when the same master disk is used consecutively in several copying processes, since the user can easily know the total number of copied disks only by repeating the copying process without resetting the counter reset switch 43. On the other hand, if the master disk is replaced with another master disk, the user can reset the number of copied disks by pressing the counter reset switch 43 before inserting the new master disk into the master disk drive unit.

In the present embodiment of the invention, a copying process can be started automatically only by mounting a master disk in the master disk drive unit after mounting copying disks in the copying disk drive units. Therefore, no switch for starting a copying operation is needed, and the user can initiate a copying process only by inserting disks into disk drive units without performing any other operations. This makes it very easy to copy data from a master disk to a plurality of other disks.

Furthermore, in the present embodiment of the invention, a copying process is initiated only when the write-protection checking shows that the master disk is write-protected and the copying disk is not write-protected so as to prevent the data stored in the master disk from being erroneously deleted and also to prevent a writing error in which no data is written on a copying disk due to a user's improper operation.

Furthermore, in the present embodiment of the invention, a copying process is started by inserting a master disk and all disks are automatically ejected at the end of the copying process. However, if some disks are unsuccessful in a copying process, these unsuccessful disks will remain in disk drive units without being automatically ejected, while these unsuccessful disks may be ejected by pressing the ejection switch. This arrangement allows a user to easily identify which media were successful and which ones were unsuccessful in the copying process. If a failure occurs during a copying process, the copying apparatus gives warning to the user thereby preventing an erroneous operation during the copying process.

The percentage of a copying operation that has been performed can be displayed on the display/operation panel 4 during the copying process so as to notify the user of the progress of the copying process. Therefore, the user can predict when the copying process will be complete. On the other hand, in the displaying mode in which the number of successfully copied disks is displayed, the user can easily know the total number of disks that have been copied successfully.

Figure 10:
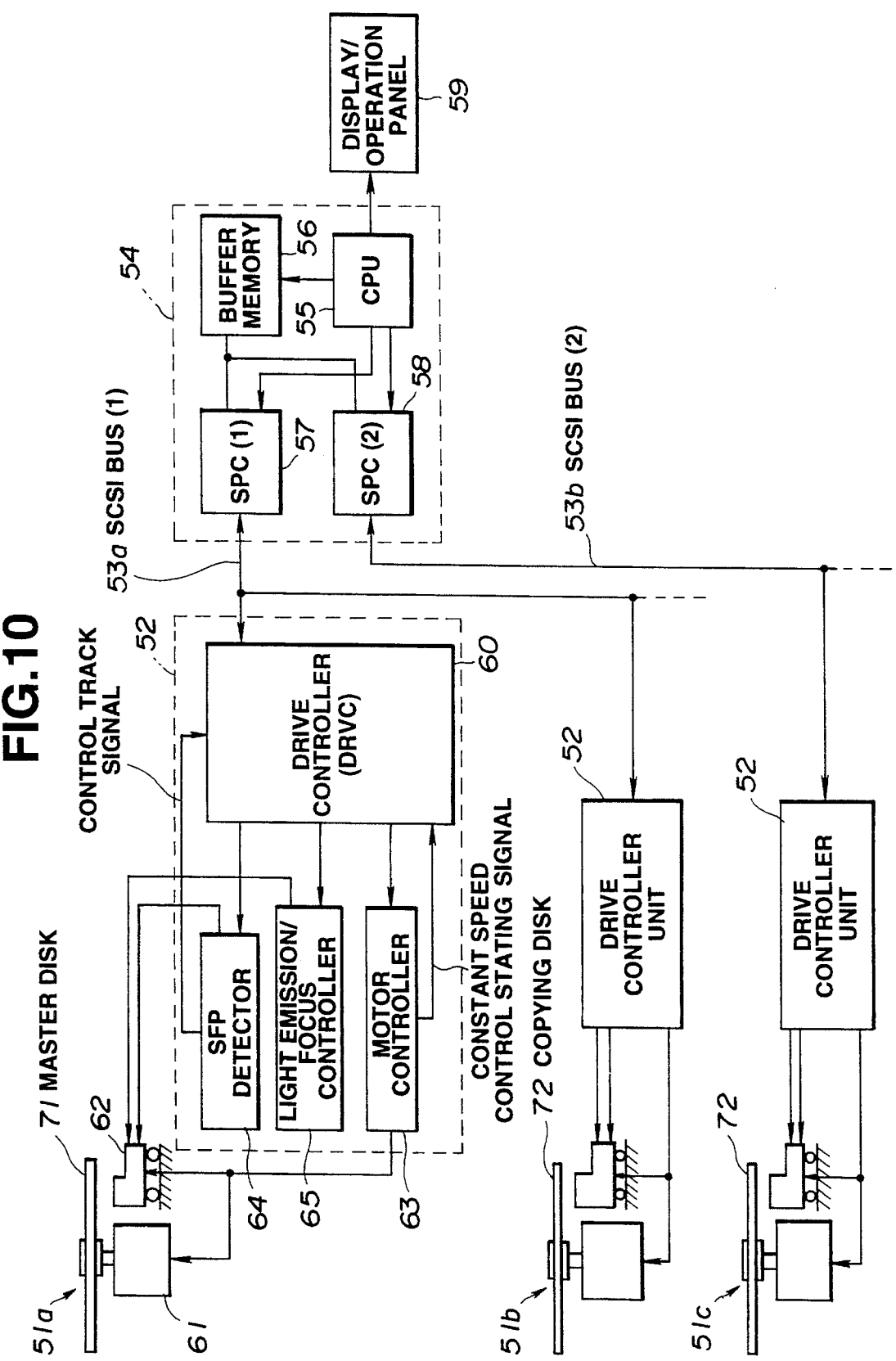
FIG. 10 is a block diagram illustrating the configuration of an information recording and reproducing apparatus according to second and third embodiments of the present invention.
Figure 11:
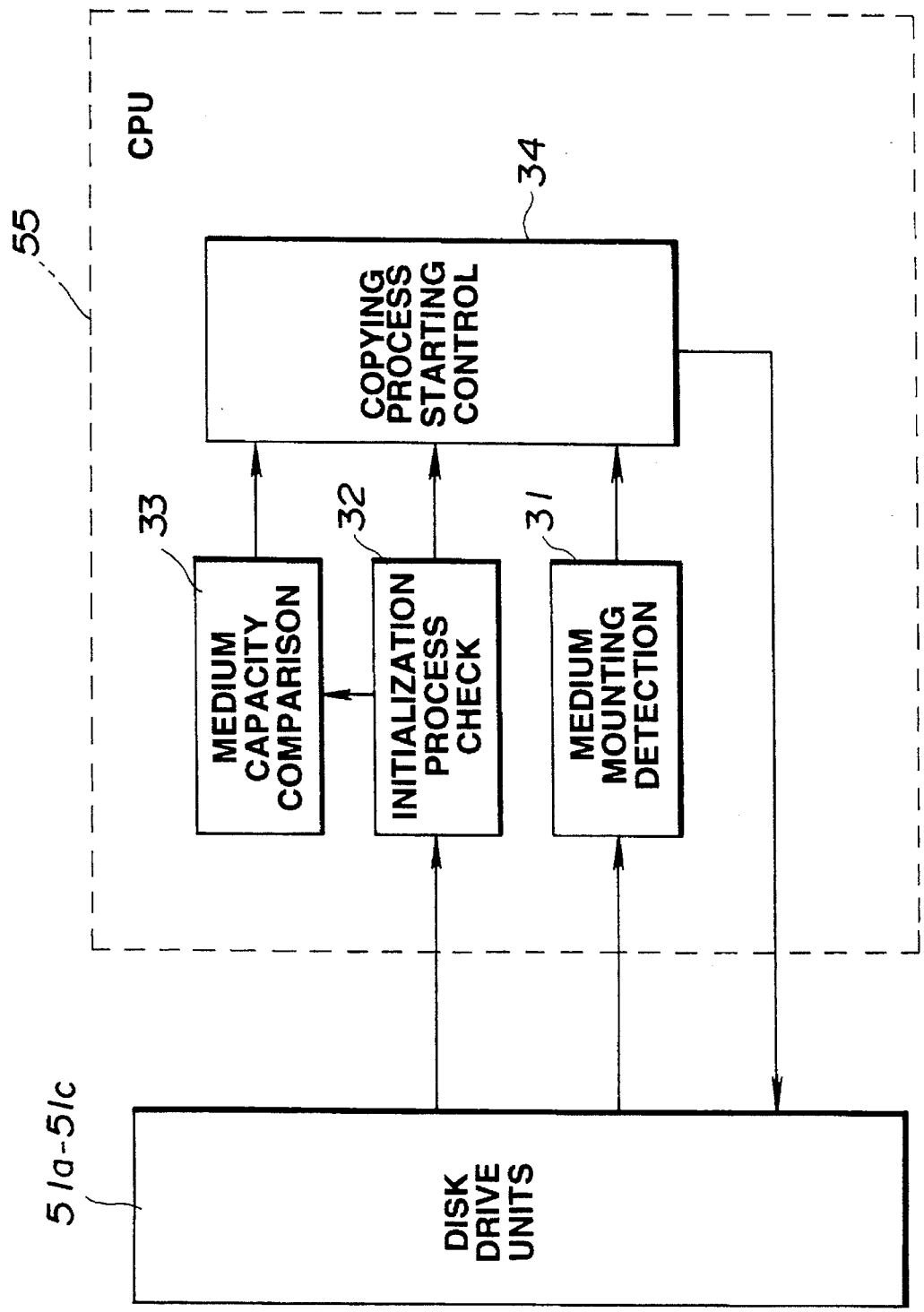
FIG. 11 is a functional block diagram of a CPU used in the second embodiment.
Figure 12:
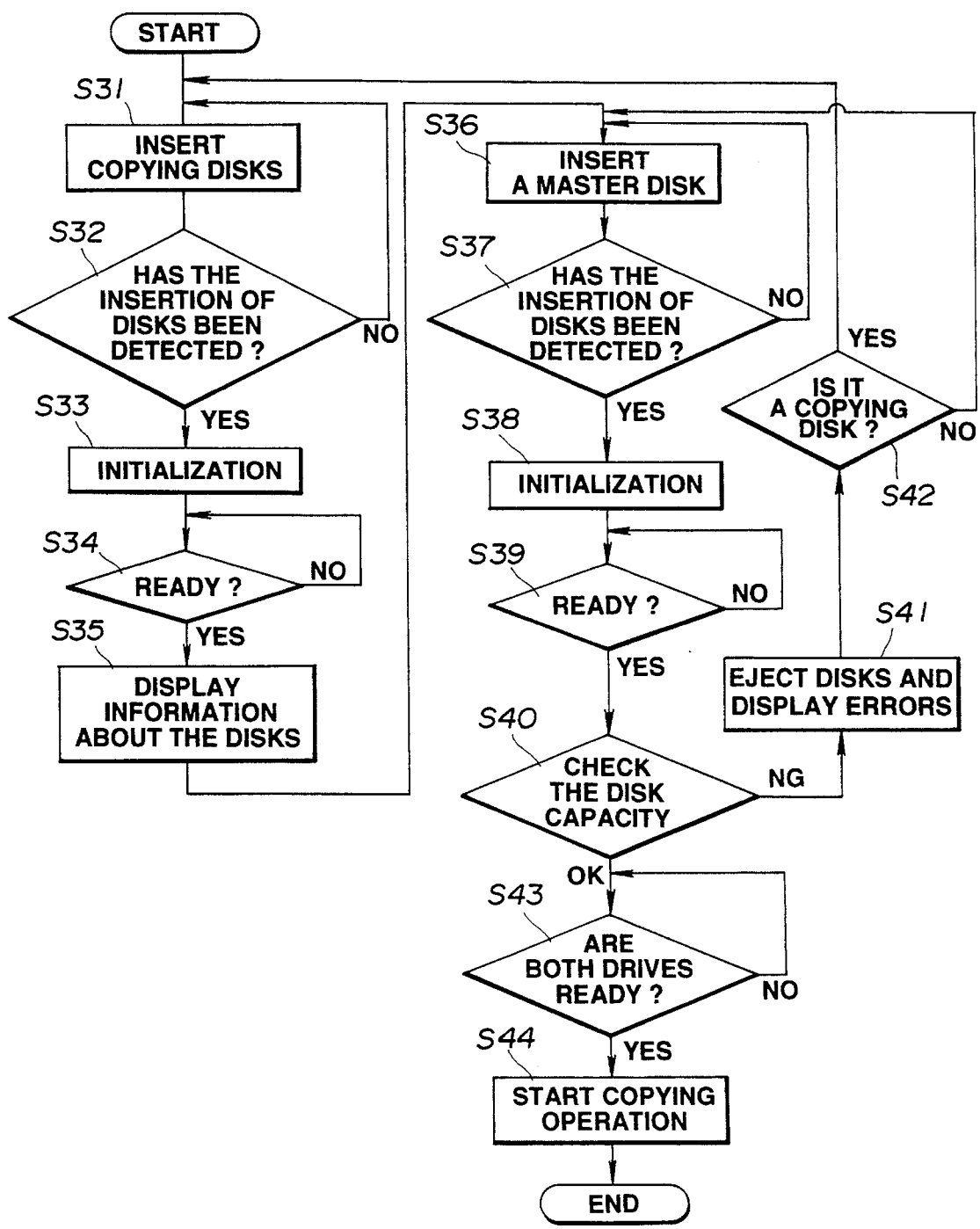
FIG. 12 is a flow chart illustrating an operation process from the beginning to the start of a copying process in the information recording and reproducing apparatus according to the second embodiment of the invention.

Referring to FIGS. 10 through 12, a second embodiment of the invention is described below.

In the first embodiment of the copying apparatus for exchangeable media described above, when the copying operation controlling means detects the insertion of a copying disk into a copying disk drive unit, the LED corresponding to the disk drive unit in which the disk has been inserted is turned off and the disk drive unit waits for the start of a copying process. However, in this situation, the following problems may occur.

1. Even if there is some failure, such as destruction of a semiconductor laser or disconnection of a spindle motor of a disk drive unit, insertion of a disk causes a detection signal to be sent to the copying operation controlling means, which may cause a copying operation to start. In this case, although the copying operation will not copy any information onto copying disks, these disks will be considered to be successful in the copying process and will be ejected from the disk drive units.

2. The actual starting of a copying process is delayed if the pre-process such as an initialization process associated with copying disk drive units which is performed before starting a copying process, requires a relatively long time compared to a time from the start of a copying process to the completion of transmission of information to the copying operation controlling means.

3. When a disk drive unit having the capability of handling high density media, such as double density disks, are employed, if a disk other than a double density disk is inserted in a disk drive unit, it is impossible to determine whether data should be copied in a normal format or in a double density format and thus, a proper copying process is impossible.

To solve the above problems, as described hereinbelow in detail, a second embodiment of the information recording and reproducing apparatus according to the present invention has the capability of preventing erroneous starting of a copying process under an abnormal condition and also has the capability of starting a copying process without significant waiting time, thereby achieving high reliability and high efficiency in the copying process.

In this embodiment, as shown in FIG. 10, the information recording and reproducing apparatus includes: a master disk reading drive unit 51a serving as master medium reproducing means for reading data from a master disk mounted in the drive unit 51a; and a plurality of disk drive units 51b, 51c, . . . serving as copying-medium recording means for writing data onto media mounted in the plurality of disk drive units 51b, 51c. The disk drive units 51a, 51b, 51c each have their own drive controller unit 52 for controlling their operation.

The information recording and reproducing apparatus also includes a controller 54 serving as copying operation controlling means for controlling the plurality of disk drive units 51a, 51b, and 51c wherein the disk drive units 51a, 51b, and 51c are connected to the controller 54 via two SCSI buses 53a and 53b. The configuration of the apparatus according to the second embodiment is similar to that of the first embodiment, and thus FIG. 10 represents disk drive units and related elements in more detail than other elements.

In the example shown in FIG. 10, the disk drive units 51a, 51b are connected to the SCSI bus (1) 53a and the disk drive unit 51c is connected to the SCSI bus (2) 53b so that control commands and data may be transmitted between these disk drive units and the controller 54 via the SCSI buses 53a and 53b. Whereas only two copying disk drive units 51b and 51c are shown in FIG. 10, a greater number of copying disk drive units may be connected to the SCSI buses 53a, 53b.

Each drive controller unit 52 includes: a drive controller (DRVC) 60 consisting of a microprocessor (MPU); a motor controller 63 for driving and controlling a spindle motor 61 used to rotate a disk and also for driving and controlling a voice coil motor of an optical head 62; an SFP (standard format part) detector 64 for detecting an SFP included in a control track of a disk from read pulses detected by the optical head 62; and a light emission/focus controller 65 for controlling the light emission and focusing of the optical head 62. The drive controller 60 receives read pulses from the optical head 62 and demodulates them into read data. The drive controller 60 also transmits control signals to the motor controller 63, the SFP detector 64, and the light emission/focus controller 65 so as to perform an initialization process such as the control of the rotation of the spindle motor 61, the adjustment of the optical power of the semiconductor laser installed in the optical head 62, the locking adjustment of the focusing servo system, and the reproduction of control tracks.

The controller 54 includes: a CPU 55 responsible for controlling various elements; a buffer memory 56 for storing data read from a master disk via the disk drive unit 51a during a copying process wherein an amount of data corresponding to a predetermined number of blocks is read; and SCSI protocol controllers (SPC) (1) 57 and (2) 58 responsible for sequential control associated with the SCSI buses (1) 53a and (2) 53b, respectively. The apparatus also includes a display/operation panel 59 connected to the CPU 55 of the controller 54 so that the operation status of the apparatus can be displayed. As in the display/operation panel 4 shown in FIG. 4, the display/operation panel 59 may display various information such as the percentage of a copying process displayed on the counter display 41, the total capacity of a master or copying disk, and occurrence of failure in disk drive units indicated by LEDs.

In the controller 54, the CPU 55 controls the SPC (1) 57, the SPC (2) 58, the buffer memory 56, and the display/ operation panel 59 by sending control signals to these elements as represented by arrows in FIG. 10. Under the control of the CPU 55 controls via the SPC (1) 57 and the SPC (2) 58, the writing and reading operations of the disk drive units 51a–51c connected to the SCSI buses 53a and 53b are performed as follows: A given amount of data corresponding to a predetermined number of blocks is read at a time from a master disk 71 mounted in the master disk drive unit 51a and then stored in the buffer memory 56. The data stored in the buffer memory 56 is then transferred to the disk drive units 51b and 51c and written onto copying disks 72 mounted in the respective disk drive units. The CPU 55 controls the display/operation panel 59 so that conditions of the apparatus are displayed on it.

The buffer memory 56 is constructed with a semiconductor memory having a capacity of, for example, 2 MB wherein the capacity is determined depending on the time efficiency required in copying operations. A part of data read from the master disk 71 is stored temporarily in the buffer memory 56. In this embodiment, two SCSI buses are used so as to improve the operating efficiency of disk drive units thereby improving the copying operation speed, whereas the number of SCSI buses can be selected properly depending on the total number of disk drive units used. Whereas only one disk drive unit is connected to each SCSI bus in the example shown in FIG. 10, the number of disk drive units connected to each SCSI bus may be properly selected within the range from 1 through 7.

FIG. 11 is a functional block diagram of the CPU 55 according to the second embodiment, whereas only main blocks are shown.

As shown in FIG. 11, the CPU 55 essentially consists of: medium mounting detection means 31 for detecting if disks are mounted in the disk drive units by checking for example signals generated by switches disposed near the insertion slots of the disk drive units; initialization process checking means 32 for checking whether initialization processes associated with master and copying disk drive units are complete without any error; medium capacity comparison means 33 for comparing capacities of copying disks mounted in the copying disk drive units with the capacity of a master disk; and copying process starting means 34 for starting a copying process in response to the detection results given by the medium mounting detection means 31 and the initialization process checking means 32, wherein the copying process is started when a master disk and copying disks are mounted in corresponding disk drive units and initialization processes of the disk drive units are complete and ready for a copying process.

That is, the CPU 55 detects, via the medium mounting detection means 31, whether a master disk and copying disks are mounted in the master disk drive unit and the copying disk drive units, and checks via the initialization process checking means 32 whether initialization processes associated with the disk drive units have been completed without error. If it is concluded that copying disks are mounted in the copying disk drive units which are in a waiting state after the completion of the initialization process, and that a master disk is mounted in the master disk drive unit which is in a waiting state after the completion of the initialization process, then the copying process starting means 34 starts a copying process. In another embodiment, if, in addition to the above conditions checked by the medium mounting detection means and the initialization process checking means, the medium capacity comparison means 33 concludes that the capacities of copying disks are equal to or greater than the capacity of a master disk as a result of comparison between these capacities, then the copying process starting means 34 starts a copying process.

In the information recording and reproducing apparatus according to the second embodiment of the invention, data is copied from a master disk to a plurality of copying disks at the same time as described below referring to FIG. 12, whereas the following description concentrates the process performed before starting a copying process.

In the first step S31, a user inserts a desired number of copying disks into copying disk drive units 51b and 51c thereby mounting the disks in the disk drive units. In step S32, the CPU 55 detects whether disks are mounted in the copying disk drive units 51b and 51c. If no disks are found in any disk drive unit, then the process returns to step S31 to wait until a disk is mounted. If a disk is found to be present in some disk drive unit when the power is turned on, the disk is ejected from the disk drive unit.

If it is concluded in step S32 that copying disks have been inserted into the disk drive units 51b and 51c, then the process proceeds to step S33 in which the disk drive units are initialized under the control of the drive controllers 60.

In the above initialization process, when the drive controller 60 detects the completion that a disk has been loaded, the drive controller 60 sends a motor-starting signal to the motor controller 63 thereby starting the spindle motor 61. The rotation speed of the spindle motor 61 is increased to a predetermined value (4200 rpm, for example). When the rotation speed reaches the above predetermined value (4200 rpm), the motor controller 63 sends a control signal to the drive controller 60 thereby requesting the drive controller 60 to start a constant-speed control. After that, the rotation speed of the spindle motor 61 is controlled by the drive controller 60 so that the rotation speed is maintained at the predetermined value.

The drive controller 60 then sends a voice coil motor control signal to the motor controller 63 so as to drive a voice coil motor (not shown) of the optical head 62 thereby moving the optical head 62 toward an inner position of the copying disk 72.

Furthermore, the drive controller 60 sends a control signal to the light emission/focus controller 65 so as to adjust the light emission of the semiconductor laser (not shown) installed in the optical head 62. To adjust the light emission of the semiconductor laser, the drive controller 60 includes data representing target values of optical power for reading, writing, and erasing operations wherein the data has been set in the controller 60 in advance. In response to the optical power data which is sent by the drive controller 60 for each access, the light emission/focus controller 65 drives the semiconductor laser of the optical head 62 via an APC (auto power control) circuit disposed in the light emission/focus controller 65 thereby adjusting the optical power to a target value. The value of the optical power adjusted in this way is sent to the drive controller 60 and set therein so that the optical power is controlled thereafter according to this value.

The drive controller 60 also controls the focusing servo system of the optical head 62 by sending a control signal to the light emission/focus controller 65. In response to a starting signal received from the drive controller 60, the light emission/focus controller 65 moves an objective lens of the optical head 62 within a predetermined searching range thereby performing focus searching. When a minimum focusing error signal is detected, the searching operation is stopped and a focusing servo control operation is started.

The SFP detector 62 then detects an SFP included in a control track disposed on an inner part of the copying disk.

The drive controller 60 receives the control track signal (SFP data) from the SFP detector 64, and thus detects medium information regarding the copying disk mounted in the copying disk drive unit.

Control tracks are formed on inner and outer parts of copying disks. Medium information about, for example, the format of the disk, the modulation method, the length in bytes of user data per sector, etc., is recorded on the control tracks. The drive controller 60 scans the control tracks with a light beam emitted by the optical head 62 so as to extract the SFP or the PEP (phase encode part), from which the medium information is derived and sent to the CPU 55. The medium information makes it possible to identify the specifications of a copying disk and thus identify if the disk has either normal density or high density, such as double density, triple density, etc.

In this way, the initialization process associated with the copying disk drive units 51b and 51c is complete. Each drive controller 60 makes the corresponding disk drive unit ready for reading and writing operations. The above-described initialization process is performed in parallel and separately in respective copying disk drive units 51b and 51c.

In step S34, the CPU 55 checks whether the copying disk drive units 51b and 51c are in a ready state. If no, the CPU 55 waits until the copying disk drive units 51b and 51c become ready. In step S35, the CPU 55 sends a control signal to the display/operation panel 59 so as to display the identified medium information such as the storage capacity (normal or double density) of the copying disks on the display/operation panel 59. In this ready state, the CPU 55 makes the copying disk drive units 51b and 51c wait for subsequent operations.

Before inserting disks into the copying disk drive units, the write protection sliding switch of each disk cartridge is moved to the off-position so that the write protection is released. If a disk is inserted in an incorrect manner such as in the case where a write-protected copying disk is inserted in a copying disk drive unit, warning is displayed on the display/operation panel 59. This visual warning allows a user to know the occurrence of the insertion error. The user can eject the disk having the error from the disk drive unit 51b or 51c by pressing the ejecting button. Alternatively, the apparatus may be arranged so that a disk having an error may be ejected automatically from a copying disk drive unit.

Then in step S36 the user inserts a master disk into the master disk drive unit 51 thereby mounting the master disk therein. The CPU 21 checks whether a master disk is present in the master disk drive unit 51a. If no master disk is found to be present in master disk drive unit 51a, the process returns to step S36 and stops until a master disk is mounted.

If it is concluded in step S37 that a master disk is mounted in the master disk drive unit 51a, then the process proceeds to step S38 in which an initialization process associated with the master disk drive unit 51a is performed.

The initialization process associated with the master disk drive unit 51a is performed as follows: When the mounting of a master disk is detected by the drive controller 60 responsible for controlling the master disk drive unit 51a, a motor controlling process and other processes are performed in a similar manner to the copying disk drive units. An SFP is detected from the control track of the master disk and then medium information is derived from the SFP thereby identifying the specifications such as the storage capacity of the master disk. After the completion of the initialization process associated with the master disk drive unit 51a, the drive controllers 60 each make their own master disk drive unit ready for a writing/reading operation.

In the initialization processes associated with the master and copying disk drive units, if a master disk or some of the copying disks are not removed from drive units, and these disks are mounted again in the same drive units, then SFP data representing medium information of these disks are read from a memory (not shown) and the disk drive units are made ready on the basis of these SFP data. If a new disk inserted into a disk drive unit is different only in the disk type, such as CAV or ZCAV, the initialization process may also be performed in a similar manner. As described above, a part of the initialization process can be skipped thereby shortening the processing time.

In step S39 the CPU 55 checks to see if the master disk drive unit 51a is in a ready state. If no, the CPU 55 waits until the master disk drive unit 51a becomes ready. In this ready state, the CPU 55 makes the master disk drive unit 51a wait for subsequent operations. At this stage, medium information such as the storage capacity may be displayed on the display/operation panel 59 as in the case of copying disks.

Then in step S40, the CPU 55 compares the storage capacity of the master disk with the storage capacities of the copying disks. If the storage capacity of the master disk is greater than that of some copying disk (NG), then the process proceeds to step S41 in which warning is displayed on the display/operation panel 59 and the master disk and the copying disk having the error are ejected. In step S42, it is determined whether the ejected disk is a copying disk or the master disk. If it is a copying disk, then the process returns to step S31. In the case where the master disk has been ejected, the process returns to step S36.

Prior to mounting a master disk in the master drive unit, the write protection sliding switch disposed in the disk cartridge should be moved to the "on" position so that the master disk is write-protected. If a master disk is inserted in an incorrect manner as in the case where a master disk that is not write-protected is inserted in the master disk drive unit, a warning is displayed on the display/operation panel 59. This visual warning informs a user of the occurrence of the insertion error. The user can eject the master disk having the error from the master disk drive unit 51a by pressing the ejecting button. Alternatively, the apparatus may be arranged so that a master disk having an error may be ejected automatically from the master disk drive unit.

If it is concluded in step S40 that the storage capacities of copying disks are equal to or greater than the storage capacity of the master disk and thus there is no problem with storage capacities, then, in step S43, the CPU 55 determines whether the master disk drive unit and the copying disk drive units are all in ready states. If the disk drive units are all waiting in ready states, then the process proceeds to step S44 so as to start a copying process.

That is, a copying process can be started only by inserting a master disk into the master disk drive unit after inserting one or more disks into the copying disk drive units. In this operation, the initialization process for each disk drive unit is performed under the control of the CPU 55 such that control track information (SFP information) is detected from the master and copying disks thereby identifying the specifications of these disks. From the above information, it is checked whether there is no problem associated with the storage capacity. Furthermore, it is checked whether disk drive units are all in a ready state. If yes, then a copying process is started. The copying process is performed in substantially the same manner as in the first embodiment.

In the copying process, ejecting switches of all disk drive units 51a–51c are locked so as to prevent the disks from being ejected by mistake during the copying process. Then, the entire data is copied from the master disk to the copying disks.

The CPU 55 sends a command to the master disk drive unit 51*a* so that a part of data corresponding to a predetermined number of blocks is read from the master disk 71 and then transferred to the buffer memory 56 via the SCSI bus 53*a*. The CPU 55 then sends a command to the copying disk drive units 51*b* and 51*c* so that the data stored in the buffer memory 56 is written onto the copying disks 72 via the SCSI buses 53*a* and 53*b*. The above-mentioned copying process is performed repeatedly until all data has been copied from the master disk to the copying disks. The CPU 55 sends a control signal to the display/operation panel 59 so that the percentage of the copying process that has been accomplished is displayed on the counter display of the display/ operation panel 59.

If an error occurs during the copying operation, then a warning is displayed on the display/operation panel 59 and a disk drive unit that encountered the error is isolated from the subsequent process. If it is impossible to continue the copying process because of the error, the copying operation is terminated.

When all data has been copied, all ejecting switches of the disk drive units 51*a*–51*c* are unlocked. A command is sent to those disk drive units of the disk drive units 51*a*–51*c* that showed no errors during the copying process so that the master disk and the successfully-copied disks are ejected, whereas disks having an error are not ejected and remain in drive units. The user can be informed of the occurrence of the error from the warning displayed on the display/operation panel 59, and thus can eject a master or copying disk having the error by pressing the ejecting button of the disk drive unit. In this case, the process never proceeds to further steps unless the user ejects the master disk or copying disk having the error.

In this embodiment, if a failure (either electrical or mechanical failure) occurs in hardware such as a semiconductor laser of some disk drive unit during a copying process, the disk drive unit never goes to a ready state, and thus a copying process is never started because of an erroneous command given to the disk drive having the failure. As a result, it becomes possible to prevent an undesirable copying process when a failure occurs in the apparatus. If a hardware failure occurs in some disk drive unit during a copying process, the CPU 55 terminates the copying process and gives warning. In this case, the CPU 55 also ejects disks.

When it is desired to perform another copying operation using the same master disk, the copied disks are removed from the disk drive units and new copying disks are inserted into the copying disk drive units 51*b* and 51*c*. The same master disk is then inserted into the master disk drive unit 51*a* so as to start a copying process. If a copying process using another master disk is required, new copying disks are inserted into the copying disk drive units 51*b* and 51*c* and then a new different master disk is inserted into the master disk drive unit 51*a* so as to-start the copying process.

In this embodiment of the invention, when master and copying disks are inserted into disk drive units, a copying process is started after checking that the initialization process associated with the master and copying disk drive units has been performed and thus they are now ready for reading and writing operations. This allows a quick start of a copying operation without an unnecessary waiting time.

In the initialization process according to the present embodiment, disk information is detected from the control tracks of master and copying disks and comparison regarding the storage capacity is made between the master disk and the copying disks using the detected information before starting a copying process. This allows the same apparatus to handle various types of disks having different storage capacities such as a double density disk, triple density disk, etc. In this case, medium information such as the storage capacity of master and copying disks is checked before starting a copying process so that the copying process can be performed properly depending on the type of the medium. This prevents a copying process from being performed unnecessarily when there is a mismatch in the storage capacity among media.

Furthermore, if a failure occurs in some disk drive unit, a copying operation is terminated and then a disk is ejected immediately from the disk drive unit. A further copying process is inhibited so that an erroneous copying operation is prevented.

As described above, the present embodiment of the invention provides high reliability and high efficiency in the copying process.

Figure 13:
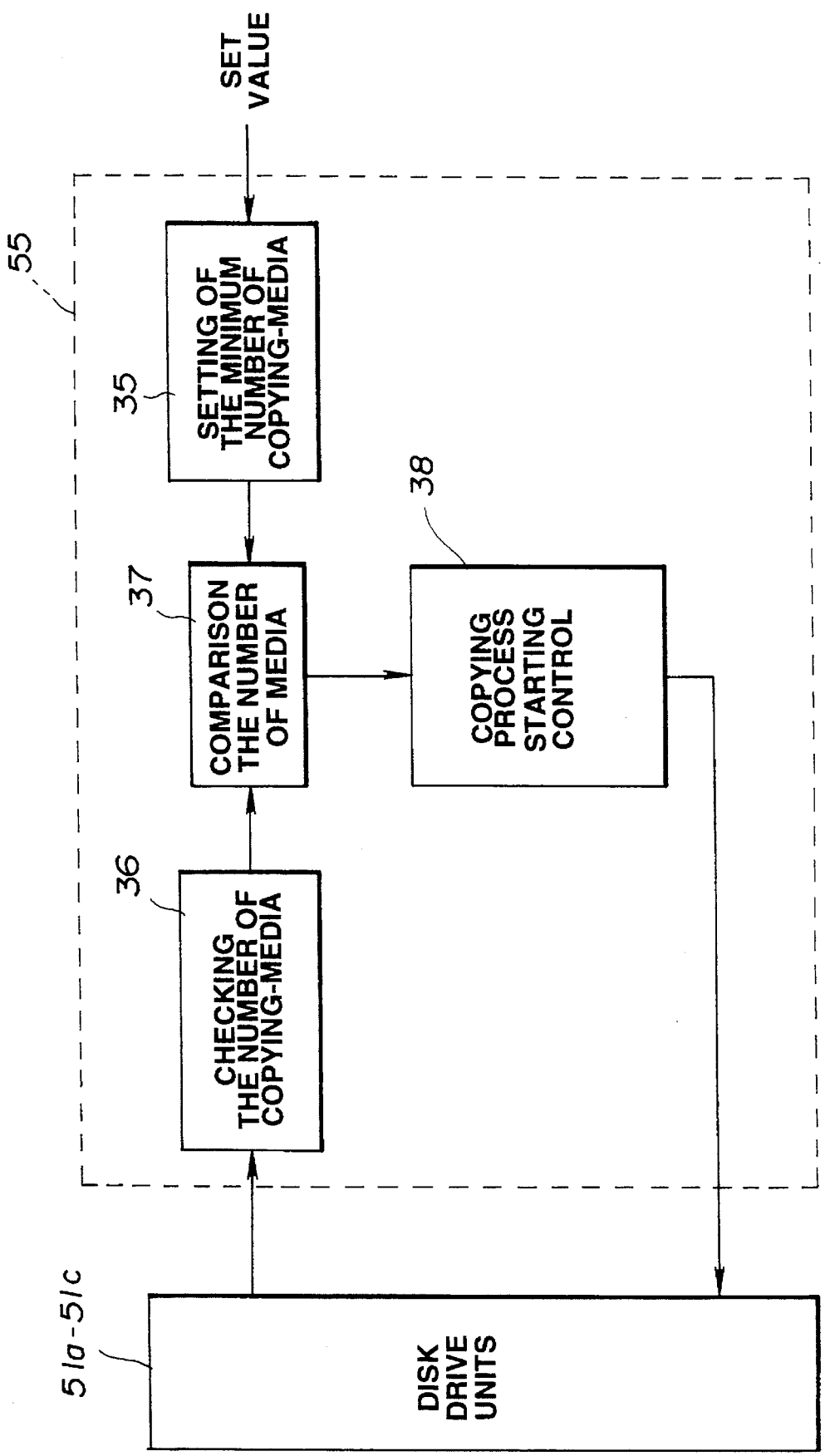
FIG. 13 is a functional block diagram of a CPU used in the third embodiment.
Figure 14:
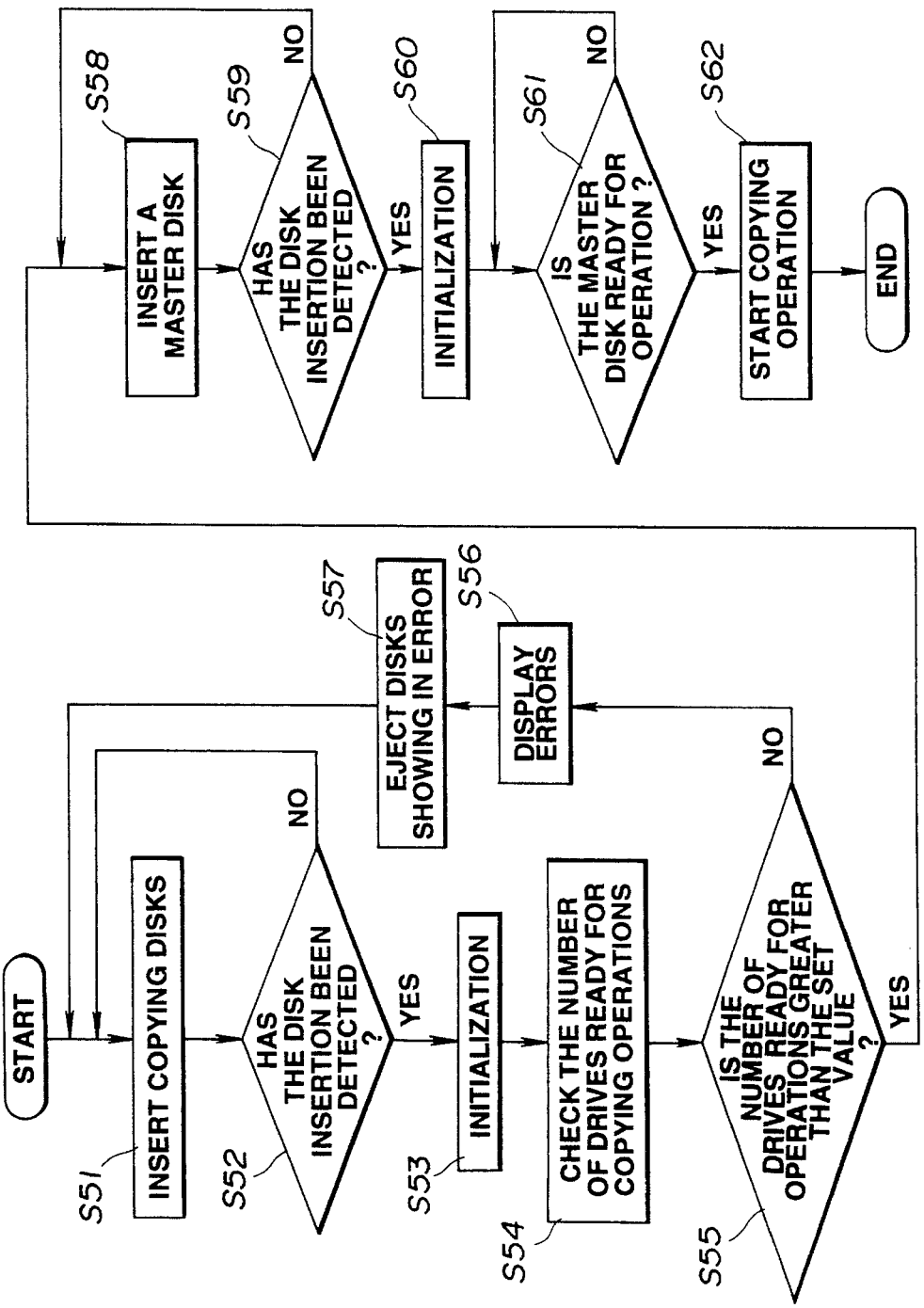
Figure 15:
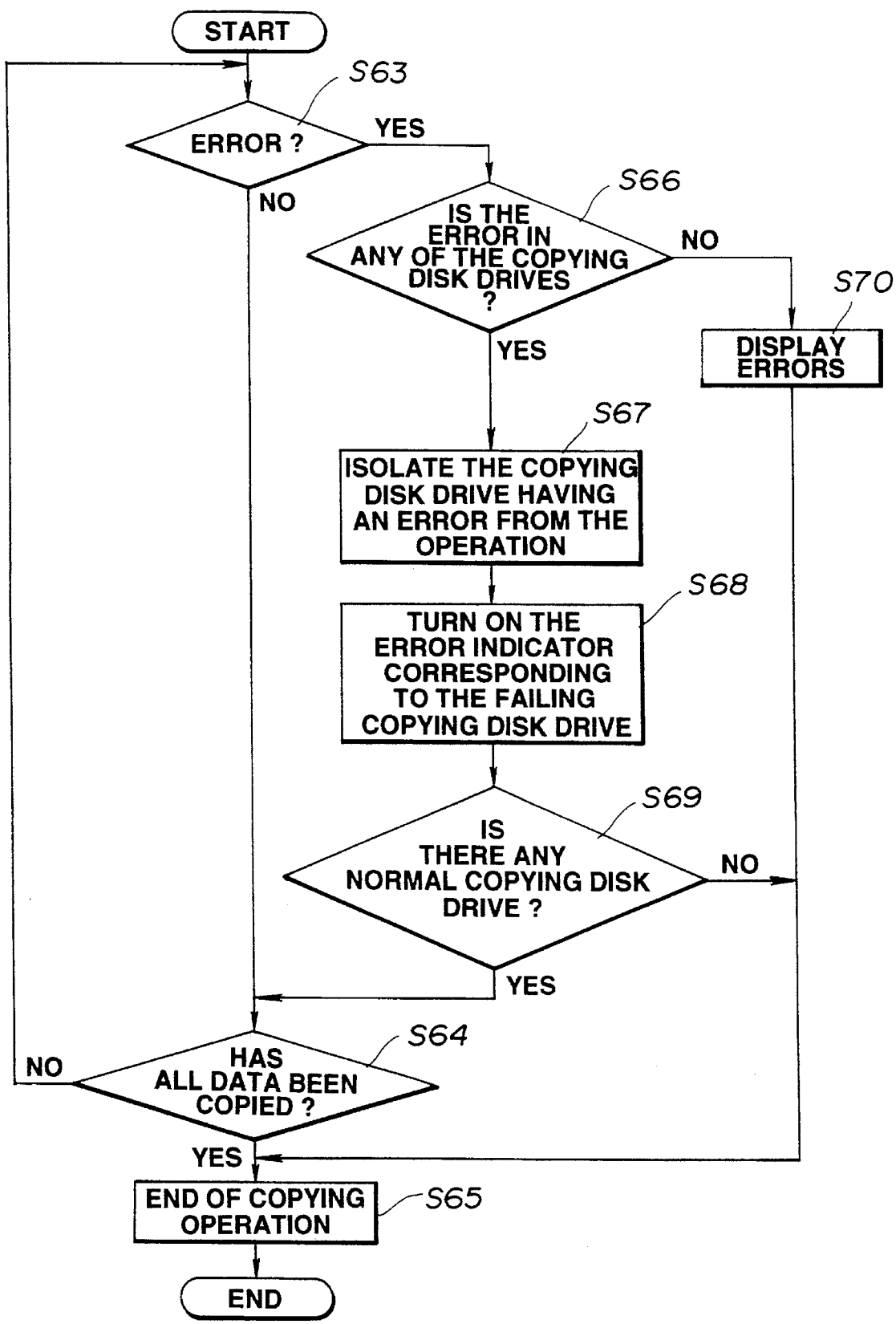

Referring to FIGS. 13 through 15, a third embodiment of the invention is described below.

In a copying apparatus for exchangeable media as described above, copying disks are initialized before starting a copying process. Furthermore, the disks are checked for various problems, such as defects. If an error or a defect is detected in a copying disk drive unit or on a disk mounted in the copying disk drive unit, an error handling process is then performed for the disk drive unit having the error or the defect. The error handling process can be performed in various manners depending on the type of the error. One example is to eject a copying disk from the copying disk drive unit having the error. Another example is to give a visual or acoustic warning to a user. As for normal disk drive units having disks with no error, the copying process is continued further.

The failures or errors associated with copying disk drive units and copying disks include destruction of a semiconductor laser serving as a light source of an optical pickup, a failure of a spindle motor, insufficient storage capacity of a copying disk relative to the storage capacity of a master disk, a reading error during an initialization process of a copying disk, etc.

In the copying apparatus of this type for exchangeable media, some problems may take place depending on the configuration as described below.

In the case of a copying apparatus including one master disk drive unit and ten copying disk drive units, and thus having the capability of copying a maximum of ten initialized disks at a time, such problems described below may occur.

1. If the copying apparatus is designed such that a copying process can be started only when all ten copying disk drive units become ready after the initialization process, copying disks having a defect must be replaced with good disks or copying disk drive units having a failure must be repaired until all ten drive units no longer have failure and thus all drive units go to a ready state.

In particular, if the initialization process requires a rather long time, a long waiting time can occur before starting a copying process, and thus the copying process becomes time-consuming.

2. If the copying apparatus is designed such that a copying process is started even if only a small number, for example one, of copying disk drive units are initialized without errors and in a ready state.

There is a possibility that the number of copying disks that are processed at a time becomes small and thus the efficiency of the copying process becomes very low.

To solve the above problems, as described in detail below, there is provided a third embodiment of an information recording and reproducing apparatus capable of preventing undesirable starting of a copying process when only a small number of copying media have been initialized successfully, and also capable of starting a copying process without an unnecessarily long waiting time, thereby achieving high reliability and high efficiency in the copying process.

Whereas some of the capabilities of the third embodiment of the information recording and reproducing apparatus are different from those of the second embodiment, there is no difference in the hardware configuration. Therefore, a detailed description of the hardware configuration is not repeated here.

FIG. 13 is a functional block diagram of the CPU 55 according to the third embodiment, illustrating only main blocks.

According to the third embodiment, the CPU 55 essentially consists of: minimum copying-media number setting means 35 including a ROM for storing data representing a minimum number of copying disks; means 36 for checking the number of media that have been initialized successfully without errors and which are now ready for a copying process; medium number comparison means 37 including a comparator for comparing the number of copying disks ready for a copying operation with the minimum number set in the minimum copying-media number setting means 35, wherein the number of copying disks ready for a copying process is given by the above-described means 36 for checking the number of media ready for a copying process; and copying process starting means 38 for starting a copying process only when the medium number comparison means 37 has concluded that the number of copying disks ready for a copying process is greater than the minimum number.

The CPU 55 operates as follows: A minimum limiting number of copying disks is stored in the ROM serving as the minimum copying-media number setting means 35. Via the means 36 for checking the number of media ready for a copying process, the CPU 55 receives a signal from each drive control unit 52 indicating whether or not the disk drive unit has performed the initialization process successfully without errors. The CPU 55 determines the number of disk drive units which have performed the initialization process successfully without errors and which are now in a "ready" state. The medium number comparison means 37 compares the number of copying disks ready for a copying operation with the minimum limiting number that has been set in advance in the minimum copying-media number setting means 35, wherein the number of copying disks ready for a copying process is given by the above-described means 36 for checking the number of media ready for a copying process. The copying process starting means 38 starts a copying process only when the medium number comparison means 37 has concluded that the number of copying disks ready for a copying process is greater than the minimum limiting number.

According to the third embodiment of the invention, the information recording and reproducing apparatus copies data from a master disk to a plurality of copying disks at a time as described below. First, the process performed before starting a copying process is described referring to the flow chart shown in FIG. 14.

In the first step S51, a user inserts a desired number of copying disks into copying disk drive units 51b and 51c thereby mounting the disks therein. In step S52, the CPU 55 detects whether disks are mounted in the copying disk drive units 51b and 51c. If no disks are found in any disk drive unit, then the process returns to step S51 and waits until a disk is mounted. If a disk is found to be present in some disk drive unit when the power is turned on, the disk is ejected from the disk drive unit.

If it is concluded in step S52 that copying disks have been inserted into the disk drive units 51b and 51c, then the process proceeds to step S53 in which the disk drive units perform an initialization process. In the initialization process, spindle motors 61 are started. The rotation speeds of the spindle motors 61 are increased to a predetermined constant value and then maintained at that value. The optical power of a semiconductor laser of each optical head 62 is adjusted to a proper value. Control associated with the optical heads 62 (seek control, focus control, tracking control, etc.) is performed, and the types of the media are identified from the information detected from control tracks of the copying disks. The above initialization process is performed under the control of the drive controllers 60 corresponding to the respective disk drive units as in the case of the second embodiment. After the completion of the initialization process, the CPU 55 makes the copying disk drive units 51b, 51c, . . . wait for subsequent operations.

In step S54, the CPU 55 determines the number of copying disk drive units that are in a ready state. In step S55, the number of copying disk drive units that are in the ready state is compared with the minimum limiting number set in the minimum copying-media number setting means. If the number of copying disk drive units that are in the ready state is greater than the minimum limiting number, then the process proceeds to step S58. In the opposite case, the process proceeds to step S56.

In step S56, a warning is displayed on the display/operation panel 59 so that the user can know that some copying disk drive unit has an error. In step S57, a copying disk having an error is ejected, and then the process returns to step S51 in which the process waits until the user inserts another copying disk.

If it is concluded in step S55 that the number of copying disk drive units that are in a ready state is greater than the minimum limiting number, then in step S58 the user inserts a master disk into the master disk drive unit 51a thereby mounting the master disk therein.

In step S59, the CPU 55 detects whether a master disk is mounted in the master disk drive unit 51a. If no master disk is found in the master disk drive unit 51a, then the process returns to step S58 to wait until a master disk is mounted. If it is concluded in step S59 that a master disk is mounted in the master disk drive unit 51a, then the process proceeds to step S60 in which the master disk drive unit 51a performs an initialization process.

The initialization process is performed under the control of the drive controller 60 for the master disk drive unit 51a in such a manner described below. After detecting that the master disk has been loaded successfully, processing, such as motor control processing, is performed in the same manner as in the case of the copying disk drive units. Then, medium information is derived from an SFP detected from the control track of the master disk, and thus the specifications such as the storage capacity of the master disk are identified. After the completion of the initialization process of the master disk drive unit 51a, the drive controllers 60 make the corresponding disk drive units ready for a reading or writing operation.

In the above initialization processes of the master and copying disk drive units, if a master disk or some copying disks are not removed entirely from drive units and these disks are mounted again in the same drive units, then SFP data representing medium information of these disks are read from a memory (not shown) and the disk drive units are made ready on the basis of these SFP data. In the case where a new disk inserted into a disk drive unit differs only in the disk type such as CAV or ZCAV, the initialization process may also be performed in a similar manner. As described above, a part of the initialization process can be skipped, thereby shortening the processing time.

In step S55 the CPU 55 checks whether the master disk drive unit 51a is in a ready state. If no, the CPU 55 waits until the master disk drive unit 51a is ready. In this ready state, the CPU 55 makes the master disk drive unit 51a wait for subsequent operations.

If it is concluded in step S61 that the master disk drive unit is in a ready state, then the process proceeds to step S62 in which the copying process starting means starts a copying process.

In this embodiment, as described above, a minimum limiting number of copying disks that should be initialized successfully without error is defined in advance. A copying process is started only when the number of copying disks having no errors is greater than the minimum limiting number. As a result, a high efficiency is achieved in the copying operation.

In the example described above, the minimum limiting number is stored in the ROM of the minimum copying-media number setting means. Alternatively, the ROM may be replaced with a RAM, and a minimum limiting number may be stored in the RAM. In this case, the minimum limiting number can be varied depending, for example, on the type of a master medium. For example, whenever a rather long time is required for the initialization process, it is desirable to set a rather large value as the minimum limiting number in order to obtain high efficiency. On the other hand, if the initialization process requires a rather short time, it is then reasonable to set a rather small value as the minimum limiting number in order to minimize the number of operations, such as exchanging of disks, that must be performed by a user.

In the case where the minimum limiting number is variable, a value may be input for example via the display/operation panel 59 by operating an input switch disposed on the display/operation panel 59. When it is desired to change the minimum limiting number already set, the current set value is reset by operating a reset switch disposed on the display/operation panel 59, and a new value is input by operating the input switch. Alternatively, the apparatus may be connected to a host computer so that the minimum limiting number may be rewritten via the host computer.

It is preferable that the minimum limiting number set in the minimum copying-media number setting means be greater than at least half the total number of copying disk drive units. For example, if there are ten copying disk drive units in total, the minimum limiting number should be set such that $5 \leq$ the minimum limiting number$<10$, or $50\% \leq$ the minimum limiting number$<100\%$, so that the efficiency of the copying operation is optimized.

After the completion of the initialization process, a copying process is performed as described below, referring to FIG. 15.

First, in step S63, the CPU 55 checks whether an error occurs during a copying operation. If no error has occurred, then the process proceeds to step S64 in which it is checked whether all data has been copied. If all data has already been copied to copying disks, then the process proceeds to step S65 in order to exit from the copying process.

If it is concluded in step S63 that an error has occurred, then the process proceeds to step S66 in which it is determined whether the error has occurred in some copying disk drive unit. If yes, then the process proceeds to step S67 in which the copying disk drive unit having the error is isolated from the copying process. Then, in step S68, a warning is given so that a user can know which copying disk drive has the error.

In step S69, it is determined whether there is still a copying disk drive unit having no error. If yes, then the process proceeds to step S64 in order to further continue the copying process.

If it is concluded in step S66 that there is no error in any disk drive unit, that is, there is an error in the master disk drive unit, then the process proceeds to step S70 in which a warning is given so that a user is informed that the master disk drive unit has an error. Then, in step 65, copying process is terminated.

If it is concluded in step S69 that none of the normal copying disk drive units has no error, then the process proceeds to step S65 in which the copying process is terminated.

In this embodiment, as described above, a copying process is not initiated unless the number of copying disks which have been mounted successfully without error is greater than the predetermined minimum limiting number, and unless the number of copying disk drive units having no error is greater than the predetermined minimum limiting number. Therefore, it is possible to prevent an inefficient copying process, such as in the case where only one copying disk is processed thereby maximizing the efficiency of the copying process.

Furthermore, the minimum limiting number set in the minimum copying-media number setting means may be variable so that the number can be changed depending on the type of the master medium or depending on the contents of data to be copied. Thus, the copying process can be optimized for the type of the master medium or the contents of the data to be copied.

Furthermore, the minimum limiting number is set to a value greater than half the total number of the copying-medium recording means in order to prevent a copying process for a very small number of media, thereby achieving a high efficiency in the copying process.

While the present invention and its advantages have been described in detail with reference to specific embodiments, the description is merely illustrative of the invention and is not to be construed as limiting the invention. Various modifications, substitutions, and alterations may occur to those skilled in the art without departing from the true spirit and scope of the invention as defined in the appended claims.

What is claimed is:

1. An information recording and reproducing apparatus including a master medium reproducing means for reading information from a master medium, and a plurality of copying-medium recording means for writing information read from said master medium simultaneously onto a plurality of copying media thereby copying information from said master medium to said plurality of copying media, said apparatus including copying operation controlling means, said copying operation controlling means comprising:

error detection means for detecting occurrence of an error during a copying process; and medium ejection control means which, at the end of a copying process, ejects a copying medium or media on which information has been copied successfully without an error from said copying-medium recording means while leaving a copying medium or media which encountered an error during the copying process in said copying-medium recording means.

2. An information recording and reproducing apparatus including a master medium reproducing means for reading information from a master medium, and a plurality of copying-medium recording means for writing information read from said master medium simultaneously onto a plurality of copying media thereby copying information from said master medium to said plurality of copying media, said apparatus including copying operation controlling means, said copying operation controlling means comprising:

medium mounting detection means for detecting whether or not a master medium is mounted in said master medium reproducing means;

copying process starting means for starting a copying process in response to the detection of the mounting of the master medium;

error detection means for detecting occurrence of an error during a copying process; and medium ejection control means which, at the end of a copying process, ejects a master medium from which information has been copied successfully without an error from said master medium recording means, and also ejects a copying medium or media on which information has been copied successfully without an error from said copying-medium recording means while leaving a medium or media which encountered an error during the copying process in said master medium reproducing means or in said copying-medium recording means.

3. An information recording and reproducing apparatus including a master medium reproducing means for reading information from a master medium, and a plurality of copying-medium recording means for writing information read from said master medium simultaneously onto a plurality of copying media thereby copying information from said master medium to said plurality of copying media, said apparatus including copying operation controlling means, said copying operation controlling means comprising:

medium mounting detection means for detecting whether or not a master medium is mounted in said master medium reproducing means;

copying process starting means for starting a copying process in response to the detection of the mounting of the master medium; and means for indicating the percentage of a copying process which has already been performed by said copying operation controlling means.

4. An information recording and reproducing apparatus including a master medium reproducing means for reading information from a master medium, and a plurality of copying-medium recording means for writing information read from said master medium simultaneously onto a plurality of copying media thereby copying information from said master medium to said plurality of copying media, said apparatus including copying operation controlling means, said copying operation controlling means comprising:

medium mounting detection means for detecting whether or not a master medium is mounted in said master medium reproducing means;

copying process starting means for starting a copying process in response to the detection of the mounting of the master medium; and means for indicating the number of media on which information has been copied successfully without an error by said copying operation controlling means.

5. An information recording and reproducing apparatus according to claim 1, further including error warning means for giving warning of occurrence of an error if an error has occurred during a copying process performed by said copying operation controlling means.

6. An information recording and reproducing apparatus including master medium reproducing means for reading information from a master medium, and a plurality of copying-medium recording means for writing information read from said master medium onto a plurality of copying media thereby copying information from said master medium to said plurality of copying media, said apparatus including copying operation controlling means, said copying operation controlling means including:

medium mounting detection means for detecting whether a master medium is mounted in said master medium reproducing means and also detecting whether copying media are mounted in said copying-medium recording means;

initialization process checking means for checking whether initialization processes associated with said master medium reproducing means and said plurality of copying-medium recording means have been performed successfully without an error; and copying process starting means for starting a copying process provided that:

a copying medium is mounted in copying-medium recording means, the initialization process associated with said copying-medium recording means has been performed already, and said copying-medium recording means is in a ready state; and a master medium is mounted in the master medium reproducing means, the initialization process associated with said master medium reproducing means has been performed already, and said master medium reproducing means is in a ready state.

7. An information recording and reproducing apparatus according to claim 6, wherein said initialization processes associated with said copying-medium recording means and said master medium reproducing means include a process of reproducing information from control tracks of copying media and the master medium thereby detecting medium information, said medium information including information about the storage capacity of the media.

8. An information recording and reproducing apparatus according to claim 7, wherein said copying operation controlling means further includes medium capacity comparison means for comparing the storage capacity of the mounted copying media with the storage capacity of the mounted master medium on the basis of information derived as a result of the initialization process associated with said copying-medium recording means and said master medium reproducing means, and wherein said copying process starting means is adapted to start a copying process if the storage capacity of the copying media is equal to or greater than that of the master medium.

9. An information recording and reproducing apparatus according to claim 6, said copying-medium recording means and said master medium reproducing means each include their own drive controller for controlling said initialization process.

10. An information recording and reproducing apparatus according to claim 6, further including medium information displaying means for displaying medium information, said medium information including information about the storage capacity of the mounted copying media, said information being derived as a result of the initialization process associated with said copying-medium recording means.

11. An information recording and reproducing apparatus including master medium reproducing means for reading information from a master medium, and a plurality of copying-medium recording means for writing information read from said master medium onto a plurality of copying media thereby copying information from said master medium to said plurality of copying media, said apparatus including copying operation controlling means, said copying operation controlling means including:

medium mounting detection means for detecting whether a master medium is mounted in said master medium reproducing means and also detecting whether copying media are mounted in said copying-medium recording means;

initialization process checking means for checking whether initialization processes associated with said master medium reproducing means and said plurality of copying-medium recording means have been performed successfully without an error; and copying process starting means for starting a copying process provided that:

a copying medium is mounted in copying-medium recording means, the initialization process associated with said copying-medium recording means has been performed already, and said copying-medium recording means is in a ready state and waits for a recording/reproducing operation; and a master medium is mounted in the master medium reproducing means, the initialization process associated with said master medium reproducing means has been performed already, and said master medium reproducing means is in a ready state and waits for a reproducing operation.

12. An information recording and reproducing apparatus including master medium reproducing means for reading information from a master medium, and a plurality of copying-medium recording means for writing information read from said master medium onto a plurality of copying media thereby copying information from said master medium to said plurality of copying media, said apparatus including copying operation controlling means, said copying operation controlling means including:

minimum copying-media number setting means for setting a minimum limiting number of copying media which are present after the initialization process;

medium number checking means for checking the number of such copying-medium recording means having no failure in which a copying medium having no error is mounted;

medium number comparison means for comparing the number of copying-medium recording means determined by said medium number checking means with the minimum limiting number set in said minimum copying-media number setting means; and copying process starting means for starting a copying process if said medium number comparison means has concluded that said number of copying-medium recording means is greater than said minimum limiting number.

13. An information recording and reproducing apparatus according to claim 12, wherein said minimum limiting number set in said minimum copying-media number setting means is variable.

14. An information recording and reproducing apparatus according to claim 12, wherein said minimum limiting number set in said minimum copying-media number setting means has a value equal to or greater than half the total number of said plurality of copying-medium recording means.

* * * * *